US011130062B2

(12) United States Patent
Yasuhara

(10) Patent No.: US 11,130,062 B2
(45) Date of Patent: Sep. 28, 2021

(54) INFORMATION PROCESSING SYSTEM, COMPUTER-READABLE NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

(71) Applicant: Nintendo Co., Ltd., Kyoto (JP)

(72) Inventor: Naohiro Yasuhara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/878,972

(22) Filed: May 20, 2020

(65) Prior Publication Data
US 2020/0384366 A1 Dec. 10, 2020

(30) Foreign Application Priority Data
Jun. 4, 2019 (JP) .............................. JP2019-104649

(51) Int. Cl.
*A63F 13/56* (2014.01)
*A63F 13/822* (2014.01)
*A63F 13/35* (2014.01)

(52) U.S. Cl.
CPC .............. *A63F 13/56* (2014.09); *A63F 13/35* (2014.09); *A63F 13/822* (2014.09)

(58) Field of Classification Search
None
See application file for complete search history.

(56) References Cited

U.S. PATENT DOCUMENTS

| 10,052,559 | B2 * | 8/2018 | Tezuka | A63F 13/822 |
| 2014/0066210 | A1 * | 3/2014 | Watabe | A63F 13/69 |
| | | | | 463/42 |
| 2014/0317566 | A1 * | 10/2014 | Ohara | A63F 13/45 |
| | | | | 715/810 |
| 2015/0336003 | A1 * | 11/2015 | Tezuka | A63F 13/792 |
| | | | | 463/17 |
| 2018/0204527 | A1 * | 7/2018 | Wu | H05B 45/20 |

OTHER PUBLICATIONS

[Online] "Pokémon GO Let's Challenge Raid Battle", Nintendo Co., Ltd., May 16, 2019, 15 pages with English Translation, https://www.pokemongo.jp/howto/battle_03/.

* cited by examiner

*Primary Examiner* — Ronald Laneau
(74) *Attorney, Agent, or Firm* — Nixon & Vanderhye PC

(57) ABSTRACT

Information indicating damage given to an enemy character by another player before a predetermined time from a start timing when a game is started by an operation of the player is acquired as additional damage information from a server. Game processing for battling against the enemy character is executed, and a first event of giving damage calculated on the basis of the game processing, to the enemy character, and a second event of giving additional damage based on the additional damage information to the enemy character are executed. Then, information indicating the damage given to the enemy character in the first event is transmitted to the server in order to store the information in a storage section.

20 Claims, 17 Drawing Sheets

| TIME INFORMATION | PLAYER ID | GIVEN DAMAGE VALUE |
|---|---|---|
| yy/mm/dd 0:20:00 | 00100 | 1000 |
| yy:mm:dd 0:40:00 | 00200 | 2000 |
| yy:mm:dd 2:00:00 | 00100 | 1500 |
| ⋮ | ⋮ | ⋮ |

INFORMATION PROCESSING SYSTEM, COMPUTER-READABLE NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

CROSS REFERENCE TO RELATED APPLICATION

This application claims priority to Japanese Patent Application No. 2019-104649, filed on Jun. 4, 2019, the entire contents of which is incorporated herein by reference.

FIELD

The exemplary embodiments relate to control of game processing that executes a game in which a plurality of players cooperate to battle against an enemy character.

BACKGROUND AND SUMMARY

Hitherto, a cooperative game in a so-called raid battle format in which a plurality of players challenge a boss character has been known.

In the above game, generally, a plurality of players attack the boss character in the same time period. In this case, in order to reflect the hit point (HP) of the boss character in real time, each terminal constantly communicates with a server and constantly performs control of updating the HP of the boss character to the latest state.

However, to constantly update the HP of the boss character to the latest state, the amount of data communication increases. In addition, since many other players also perform communication to update the HP of the boss character in the same time period, communication with the server may also be concentrated. As a result, in some cases, the response in the raid battle game also decreases, whereby the raid battle cannot be played comfortably. Moreover, it is also conceivable to simply not update the HP of the boss character in real time. However, in this case, the sense of play may be the same as in the case of single play, and a sense of cooperative battle that the player is battling against the boss character in cooperation with the other players may be weakened.

Therefore, it is an object of the exemplary embodiments to provide an information processing system, a computer-readable non-transitory storage medium having an information processing program stored therein, an information processing apparatus, and an information processing method that are capable of executing a novel cooperative game that allows a sense of battling in cooperation with other players to be enjoyed while keeping the comfort of play in a raid battle in which a plurality of players participate.

In order to attain the object described above, for example, the following configuration examples are exemplified.

A configuration example is directed to an information processing system for providing a game in which a plurality of players cooperate to battle against enemy character, the information processing system including at least one processor. The information processing system includes a server and a plurality of information processing terminals. The server stores given damage information indicating damage given to the enemy character by each of the plurality of players and a timing when the damage is given, in a storage section included in the server. Each of the information processing terminals acquires at least a part of the given damage information of the damage given to the enemy character by another player before a predetermined time after a start timing when the game is started by an operation of the player, as additional damage information from the server, and executes game processing for a game of battling against the enemy character. In the execution of the game processing, the information processing terminal executes a first event of calculating damage to be given to the enemy character on the basis of the game processing and giving the calculated damage to the enemy character, executes a second event of giving additional damage to the enemy character on the basis of the additional damage information, and transmits the given damage information indicating the damage given to the enemy character in the first event, to the server in order to store the given damage information in the storage section.

According to the above configuration example, cooperative game processing is executed on the basis of a hit point of an enemy character a predetermined time before. In addition, attacks that have occurred in game processing for other players from the predetermined time before until the present time are used as additional damage in the cooperative game processing. Accordingly, damage by the other players is collectively acquired as additional damage at a certain timing, and thus the amount of communication can be reduced and a play sense of battling in cooperation with other players can also be provided.

In another configuration example, the server may store a hit point of the enemy character in the storage section. The information processing terminal may acquire a hit point of the enemy character a predetermined time before the start timing, as a terminal hit point from the server. The information processing terminal may execute game processing of battling against the enemy character for which the terminal hit point is set, and, if the terminal hit point after the execution of the first event and the second event satisfies a victory condition for the hit point of the enemy character, the information processing terminal may determine that the enemy character is defeated, and may end the game processing.

According to the above configuration example, the hit point of the enemy character can be managed for each player. Accordingly, the latest hit point of the enemy character is not constantly acquired, and thus the amount of communication can be reduced and a play sense of battling in cooperation with other players can also be provided.

In another configuration example, the server may acquire the given damage information from the plurality of information processing terminals, and may store a latest hit point of the enemy character calculated on the basis of the given damage information, as a latest hit point in the storage section.

According to the above configuration example, a hit point reflecting damage given by each player to the enemy character can be managed, and a sense of cooperative battle in which the player is battling against the enemy character in cooperation with a plurality of players can be provided to the player.

In another configuration example, even when the latest hit point of the enemy character satisfies the victory condition, if the hit point of the enemy character the predetermined time before does not satisfy the victory condition, the information processing terminal may acquire the hit point, as the terminal hit point of the enemy character that is caused to appear in the game processing, from the server.

According to the above configuration example, the chances that the player can battle against the enemy character can be increased.

In another configuration example, the information processing terminal may transmit a hit point of the enemy character calculated on the basis of the execution of the first event and the second event, as a hit point per player. The server may set a predetermined validity period for the acquired hit point per player and may store the hit point per player in the storage section. If the start timing is within the predetermined validity period, the information processing terminal may acquire the hit point per player, instead of the hit point of the enemy character the predetermined time before, from the server. If the start timing is within the predetermined validity period, the information processing terminal may execute game processing in which the enemy character for which the hit point per player is set appears.

According to the above configuration example, when the player plays the game a plurality of times, the player can play the game in a state where damage given to the enemy character by each of the plurality of players is adopted. For example, when a certain player gives a damage of a first value to the enemy character in the first play and then starts the second play, the player can play a game in which the enemy character to which the damage of the first value has been given appears.

In another configuration example, the server may set a first enemy character as the enemy character, and then may update the enemy character to a second enemy character if a latest hit point of the first enemy character satisfies the victory condition. If a hit point of the first enemy character the predetermined time before satisfies the victory condition and a hit point of the second enemy character does not satisfy the victory condition, the information processing terminal may acquire a hit point of the second enemy character the predetermined time before, as an enemy hit point from the server.

In another configuration example, the server may set a first enemy character as the enemy character, and then may update the enemy character to a second enemy character if a latest hit point of the first enemy character satisfies the victory condition. If a hit point per player of the first enemy character satisfies the victory condition, the information processing terminal may execute game processing in which the second enemy character appears in place of the first enemy character.

According to the above configuration example, after the player defeats a certain enemy character, the player can subsequently battle against another enemy character, so that an opportunity of battling against a plurality of enemy characters can be provided to the player, thereby enhancing the entertainment characteristics of the game.

In another configuration example, the information processing terminal may execute a first event of calculating damage to be given to the second enemy character on the basis of the game processing and giving the calculated damage to the second enemy character. Even if the additional damage information relates to damage given to the first enemy character, the information processing terminal may execute a second event of giving additional damage to the second enemy character on the basis of the additional damage information.

According to the above configuration example, the chances of additional damage occurring can be increased, and a play sense of cooperative battle can be more easily provided.

In another configuration example, in the game processing executed by the information processing terminal, a predetermined limit period for achieving the victory condition may be set. If the victory condition is not achieved within the predetermined limit period, the information processing terminal may execute the second event.

According to the above configuration example, if the player has not achieved the victory condition by themselves within the limit period, a representation that other players come to help can be performed, and a play sense of cooperative battle can be provided.

In another configuration example, it may be impossible to satisfy the victory condition by the execution of the first event, and it may be possible to satisfy the victory condition by the execution of the second event.

According to the above configuration example, the second event can be caused to occur without fail, and a play sense of battling in cooperation with other players can be provided.

In another configuration example, regardless of a result of the execution of the first event, if the victory condition is satisfied by the execution of the second event, the information processing terminal may determine that the victory condition is achieved.

According to the above configuration example, even if the player cannot contribute to the victory condition for the game by the first event, the victory condition can be achieved by the second event. Thus, a play sense of battling in cooperation with other players can be enhanced further.

In another configuration example, if a hit point of the enemy character satisfies the victory condition as a result of the calculation of the damage in the first event, the information processing terminal may execute a process in the second event and then may execute a process in the first event.

According to the above configuration example, after an attack of another player, a player's own attack occurs to achieve the game clear condition. Thus, a sense of cooperative battle can be produced, and satisfaction that the player has achieved the victory condition by themselves can be provided.

In another configuration example, the information processing terminal may acquire information indicating an image of another player character associated with another player who has caused the damage related to the additional damage information. The information processing terminal may execute the second event such that a process of displaying a motion of the other player character giving the additional damage to the enemy character is included.

According to the above configuration example, a state where the character of another player attacks the enemy character can be visually presented to the player. Accordingly, a sense of cooperative battle together with other players can be produced in the cooperative game.

According to the exemplary embodiments, game processing is performed by using a hit point of an enemy character a predetermined time before, and attacks that have occurred in game processing for other players from the predetermined time before until the present time are used as additional damage in the game processing. Accordingly, the comfort of play in the cooperative game can be improved, and a play sense of battling in cooperation with the other players can also be provided by using the additional damage.

DETAILED DESCRIPTION OF NON-LIMITING EXAMPLE EMBODIMENTS

Figure 1:
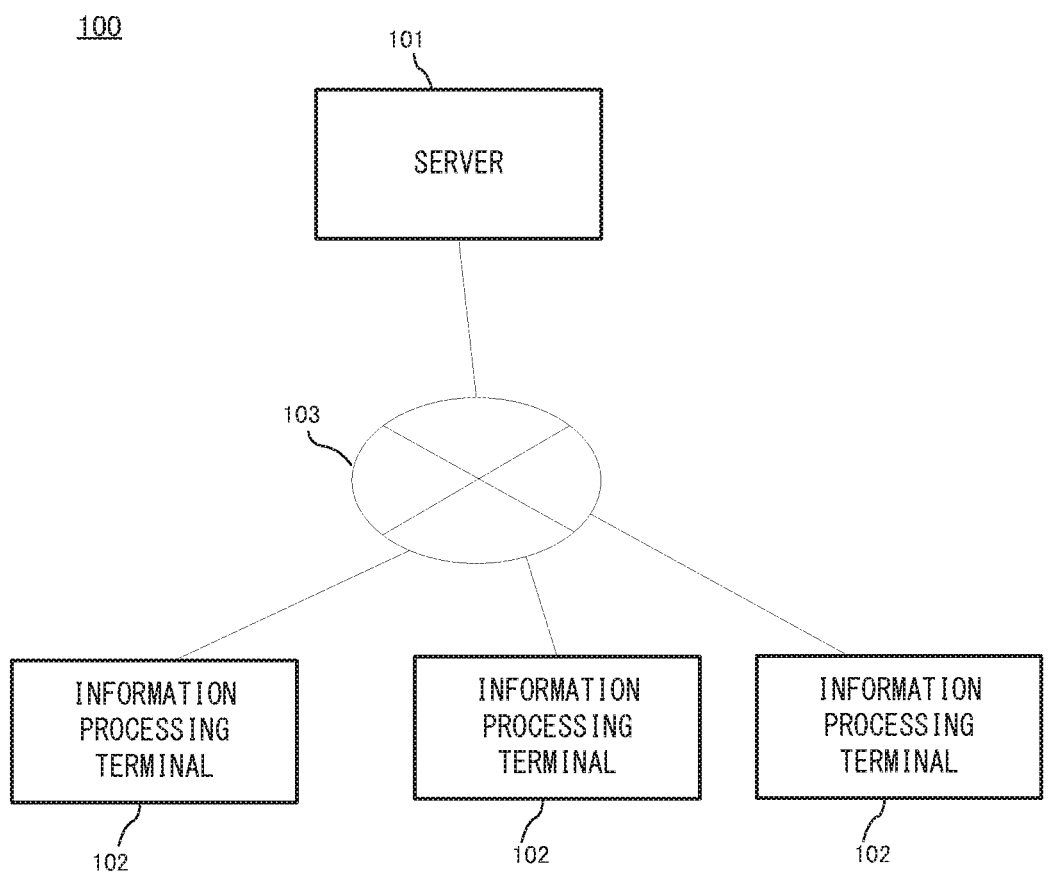
FIG. 1 is a schematic diagram illustrating a non-limiting example of the entire structure of an information processing system according to an exemplary embodiment.

Hereinafter, one exemplary embodiment will be described. It is to be understood that, as used herein, elements and the like written in a singular form with a word "a" or "an" attached before them do not exclude those in the plural form. FIG. 1 is a schematic diagram illustrating a non-limiting example of the entire configuration of an information processing system according to the present embodiment. An information processing system 100 of the present embodiment includes a server 101 and a plurality of information processing terminals 102. The server 101 and each information processing terminal 102 are configured to be able to communicate with each other via the Internet 103. In the present embodiment, with such a configuration, information processing is executed. Hereinafter, a description will be given with game processing as an example of the information processing. Specifically, game processing for which a game program is installed on the information processing terminal 102 and which is executed while communication with the server 101 is being performed as necessary, will be described as an example.

[Hardware Configuration of Server 101]

Figure 2:
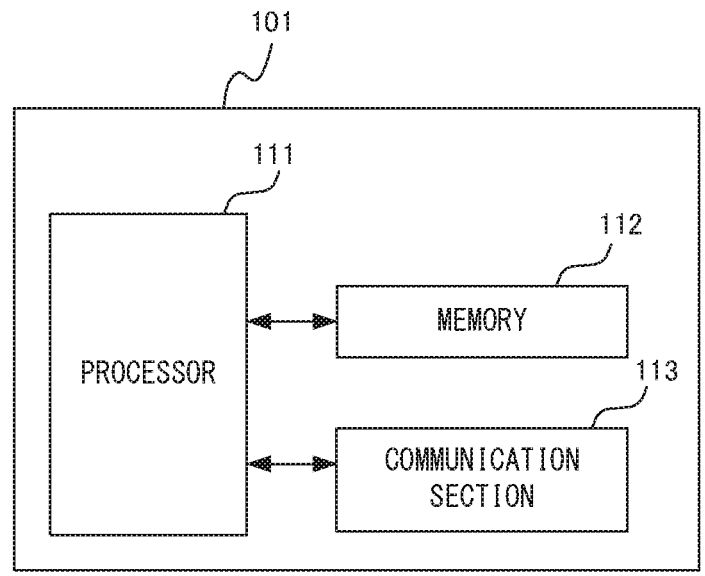
FIG. 2 is a block diagram illustrating a non-limiting example of the hardware configuration of a server 101.

Next, the hardware configuration of the server 101 will be described. FIG. 2 is a block diagram illustrating a non-limiting example of the hardware configuration of the server 101. The server 101 includes at least a processor 111, a memory 112, and a communication section 113. The processor 111 executes various programs for controlling the server 101. In the memory 112, various programs to be executed by the processor 111 and various kinds of data to be used by the processor 111 are stored. The communication section 113 connects to a network by means of wired or wireless communication and transmits/receives predetermined data to/from each information processing terminal 102 or another server (not shown).

[Hardware Configuration of Information Processing Terminal]

Figure 3:
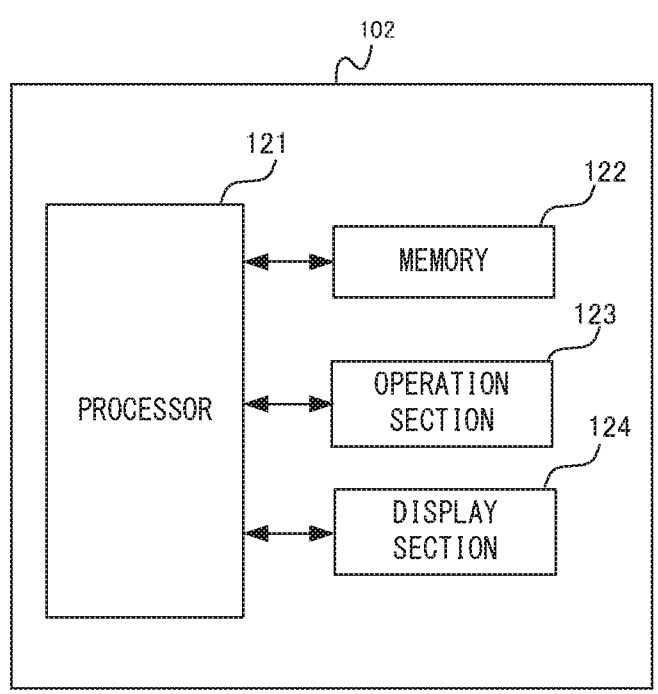
FIG. 3 is a block diagram illustrating a non-limiting example of the hardware configuration of an information processing terminal 102.

FIG. 3 is a block diagram illustrating a non-limiting example of the hardware configuration of the information processing terminal 102 in which game processing according to the present embodiment is executed. Here, in the present embodiment, for example, a smart device such as a smartphone and a tablet, a game apparatus such as a stationary game apparatus and a hand-held game apparatus, a personal computer, or the like is assumed as the information processing terminal 102. In the description of the exemplary embodiment, an information processing terminal (for example, a smartphone) including a display screen and a touch panel that are integrated with each other will be described as an example. Therefore, input operations are mainly inputs to the touch panel. However, in another exemplary embodiment, for input operation, a physical controller connected to an information processing terminal 102 wirelessly or via wire may be employed, or for example, an input apparatus formed integrally with the information processing terminal 102 may be employed.

In FIG. 3, the information processing terminal 102 includes a processor 121, a memory 122, an operation section 123, and a display section 124. The processor 121 executes later-described game processing or executes a system program (not shown) for controlling overall operation of the information processing terminal 102, thereby controlling operation of the information processing terminal 102. The processor 121 may include a single processor or a plurality of processors. In the memory 122, various programs to be executed by the processor 121 and various kinds of data to be used in the programs are stored. The memory 122 is, for example, a flash EEPROM or a hard disk device. The operation section 123 is an input device for receiving an operation from a user, and a touch panel is mainly assumed as the operation section 123 in the exemplary embodiment. In another exemplary embodiment, the operation section 123 may be various pointing devices, various press-type buttons, an analog stick, and the like. The display section 124 is typically a liquid crystal display device.

[Outline of Game Processing According to Exemplary Embodiment]

Next, the outline of game processing executed in the exemplary embodiment will be described. In the exemplary embodiment, a so-called raid battle is assumed. A raid battle is a battle in which a plurality of players challenge a boss character (hereinafter, raid boss). The raid battle of the exemplary embodiment is performed as follows. First, game processing is performed on each of the information processing terminals 102 of the plurality of players, and each player individually gives damage to the raid boss in the game processing. Information of the given damage is transmitted from each information processing terminal 102 to the server 101. If a given damage value accumulated in the server 101 exceeds the hit point (HP) of the raid boss, this means that the raid boss is defeated. If the presently appearing raid boss is defeated, the next raid boss appears. In addition, times at which raid bosses appear are determined in advance. Even if a raid boss is not defeated within a time limit, the raid boss is replaced by the next raid boss.

Hereinafter, flow of the raid battle assumed in the exemplary embodiment will be described using screen examples of FIGS. 4 to 10. First, a game assumed in the exemplary embodiment is a so-called simulation RPG. Several "events" are held in this game, and the case where a raid battle as described above is held as an "event battle" for a limited time is assumed. In addition, in the exemplary embodiment, the battle against the boss character is performed in the form of a turn-based strategy type simulation game (hereinafter, referred to as TBSG).

Figure 4:
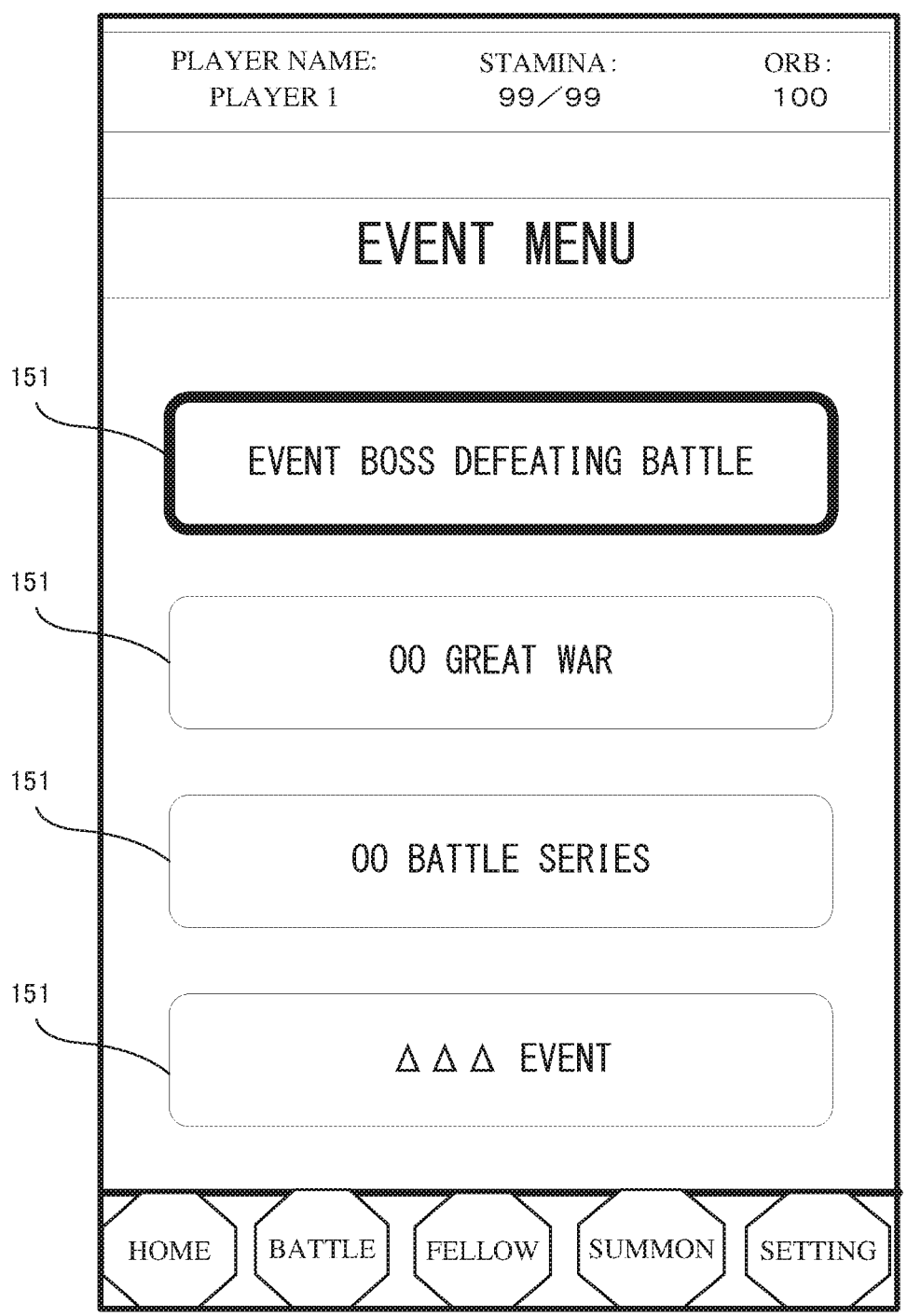
FIG. 4 illustrates a non-limiting example of a game screen.

FIG. 4 illustrates a menu screen of the "events" displayed in accordance with a predetermined operation by the player. In this screen, a plurality of banner images 151 each showing an event being held at that time are displayed. In this example, "EVENT BOSS DEFEATING BATTLE" displayed at the top indicates an event of the raid battle according to the exemplary embodiment. Thus, the player can challenge (participate in) the raid battle according to the exemplary embodiment by performing a tap operation on the banner image 151 of "EVENT BOSS DEFEATING BATTLE".

Here, a supplemental description will be given for a condition for challenging the raid battle of the exemplary embodiment. In this example, a "challenge stamina value" dedicated for challenging the raid battle is set. The player can challenge the raid battle once by consuming the challenge stamina value by one point. In addition, the challenge stamina value can be stored up to a maximum value of 8, and automatically recovers by one point per hour. Thus, if the challenge stamina value has been stored up to a maximum value of 8, the player can consecutively challenge the raid battle eight times. Hereinafter, a game for one challenge is referred to as "one game".

Figure 5:
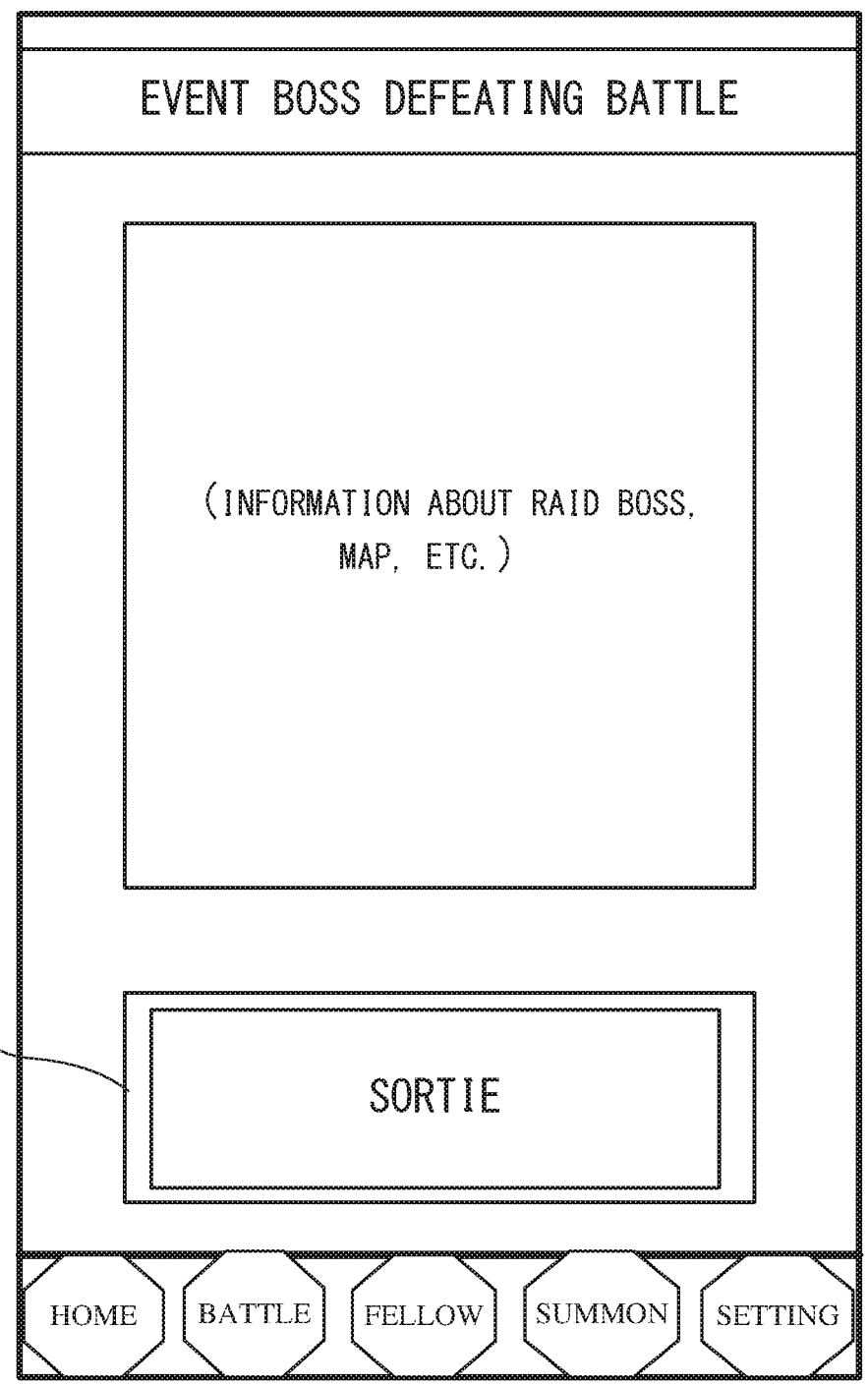
FIG. 5 illustrates a non-limiting example of a game screen.

In FIG. 4, if the player taps the banner image 151 of "EVENT BOSS DEFEATING BATTLE", a preparation process (described in detail later) for starting the raid battle is performed, and a TBSG preparation screen shown in FIG. 5 is displayed. In this screen, information (HP, an image, etc.) of a raid boss to be battled, information of a map, etc., are displayed. In addition, a "SORTIE" button 152 is also displayed. Moreover, although not shown, options for the difficulty level of the battle against the raid boss may be displayed in this screen, and the player may make a selection for the difficulty level. If the player taps the "SORTIE" button 152 in the screen, the battle against the raid boss is started in the form of TBSG.

Here, in a TBSG process in the exemplary embodiment, a plurality of game events can be executed (can occur). The process of the exemplary embodiment focuses on an event regarding an "attack against a raid boss" among these game events. Specifically, in the exemplary embodiment, two events can be executed next. First, as an example of a first event, an attack against a raid boss by own units described later is assumed. In addition, as an example of a second event different from the first event, an additional attack by an allied army described later is assumed. Hereinafter, a specific description will be given.

Figure 6:
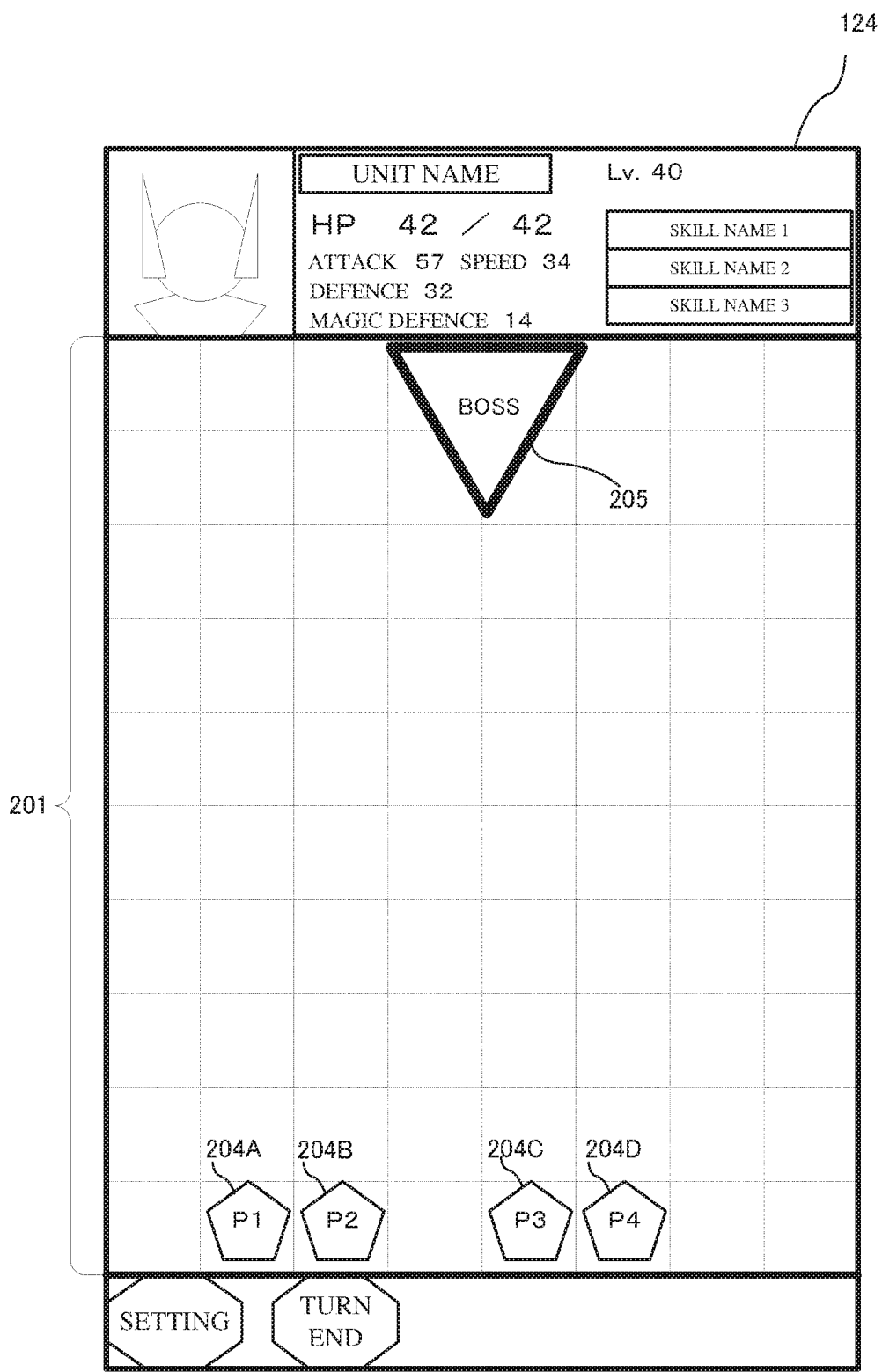
FIG. 6 illustrates a non-limiting example of a game screen.

FIG. 6 illustrates a TBSG screen example for the battle against the raid boss. In the TBSG of this example, on a map composed of a plurality of squares arranged in a grid (displayed in a map display area 201 in FIG. 6), a plurality of own units 204 are moved to attack a raid boss 205. In FIG. 6, as an example, own units 204A to 204D (hereinafter, sometimes collectively referred to as own units 204) are displayed. In addition, in the exemplary embodiment, it is assumed that one game has a maximum of seven turns. That is, the battle ends once seven turns have elapsed. Also, even within seven turns, if the damage given by the player reaches a predetermined "specified damage", the battle temporarily ends. Moreover, if the raid boss 205 is defeated by the damage given by the player, the battle ends at that time.

In the exemplary embodiment, if the raid boss 205 has not been defeated yet at the end of the battle, an "additional attack" by an "allied army" (described later) is performed, and further damage can be given to the raid boss 205. As a result of the additional attack, the raid boss 205 may be defeated. In this game, if the raid boss 205 is defeated (including the case of a defeat by an additional attack), the defeating player can also receive a special reward as a "defeat reward". Moreover, at the end of the battle, the sum of values of damage given to the raid boss 205 by the own units 204 is transmitted as a given damage value for this time of the player to the server 101. The given damage is also counted as a "score" of the player for the raid boss 205. Aside from the "defeat reward", the player can also obtain a reward corresponding to the score, at a predetermined timing.

On the other hand, if the raid boss 205 is not defeated by the additional attack, the play for one game ends at that time. Thereafter, the player can challenge the raid boss 205 again by consuming the challenge stamina.

Figure 7:
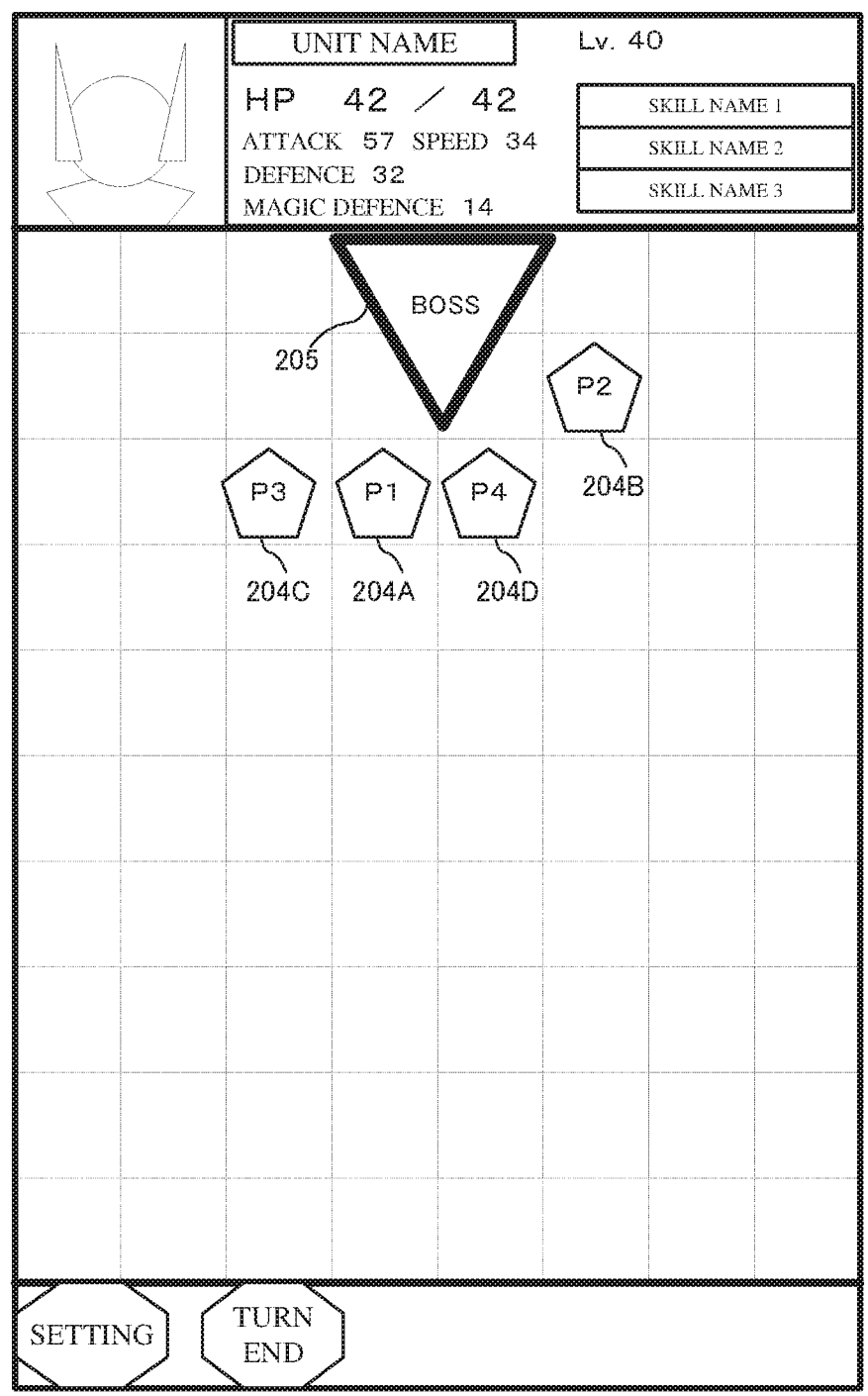
FIG. 7 illustrates a non-limiting example of a game screen.
Figure 8:
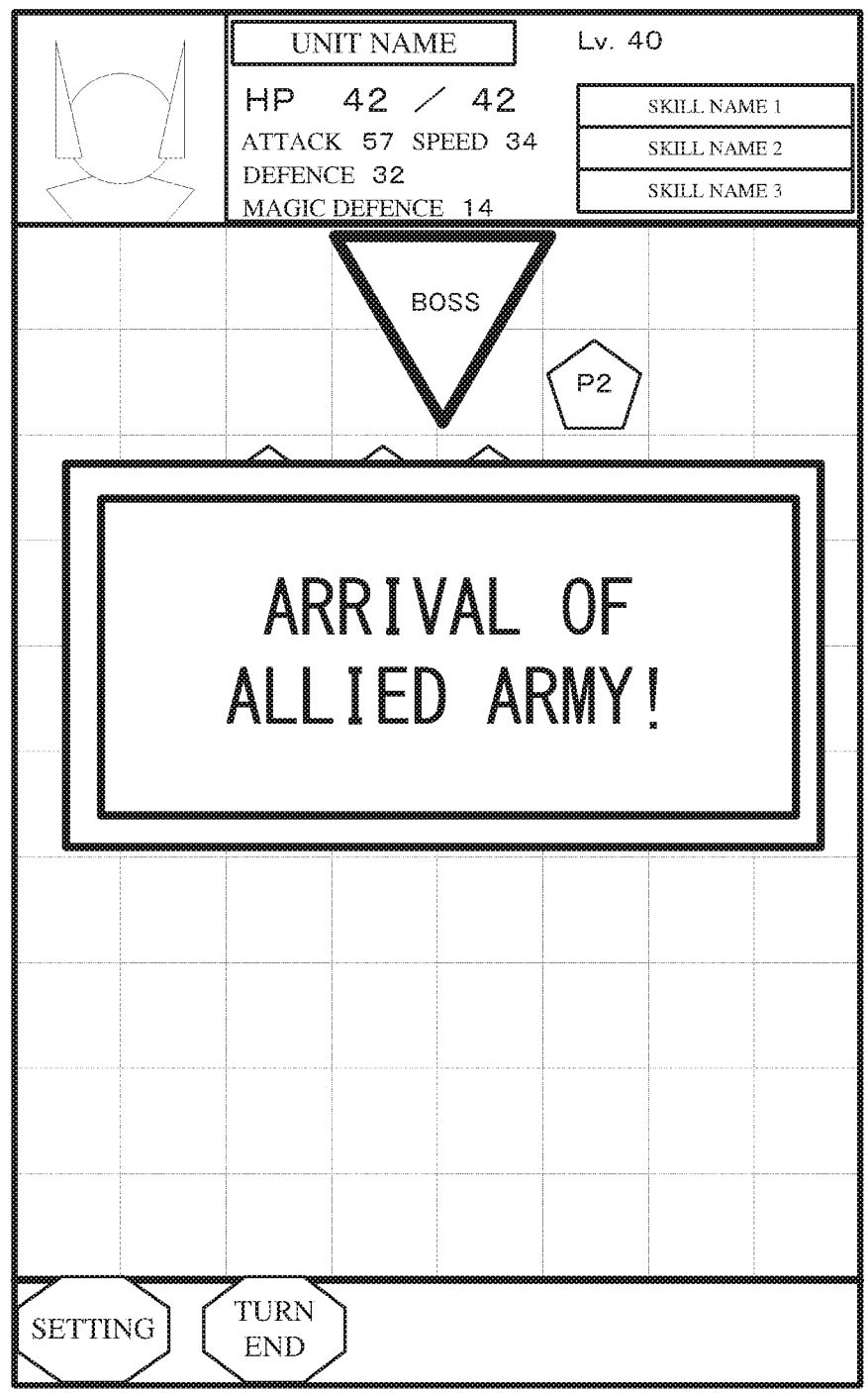
FIG. 8 illustrates a non-limiting example of a game screen.
Figure 9:
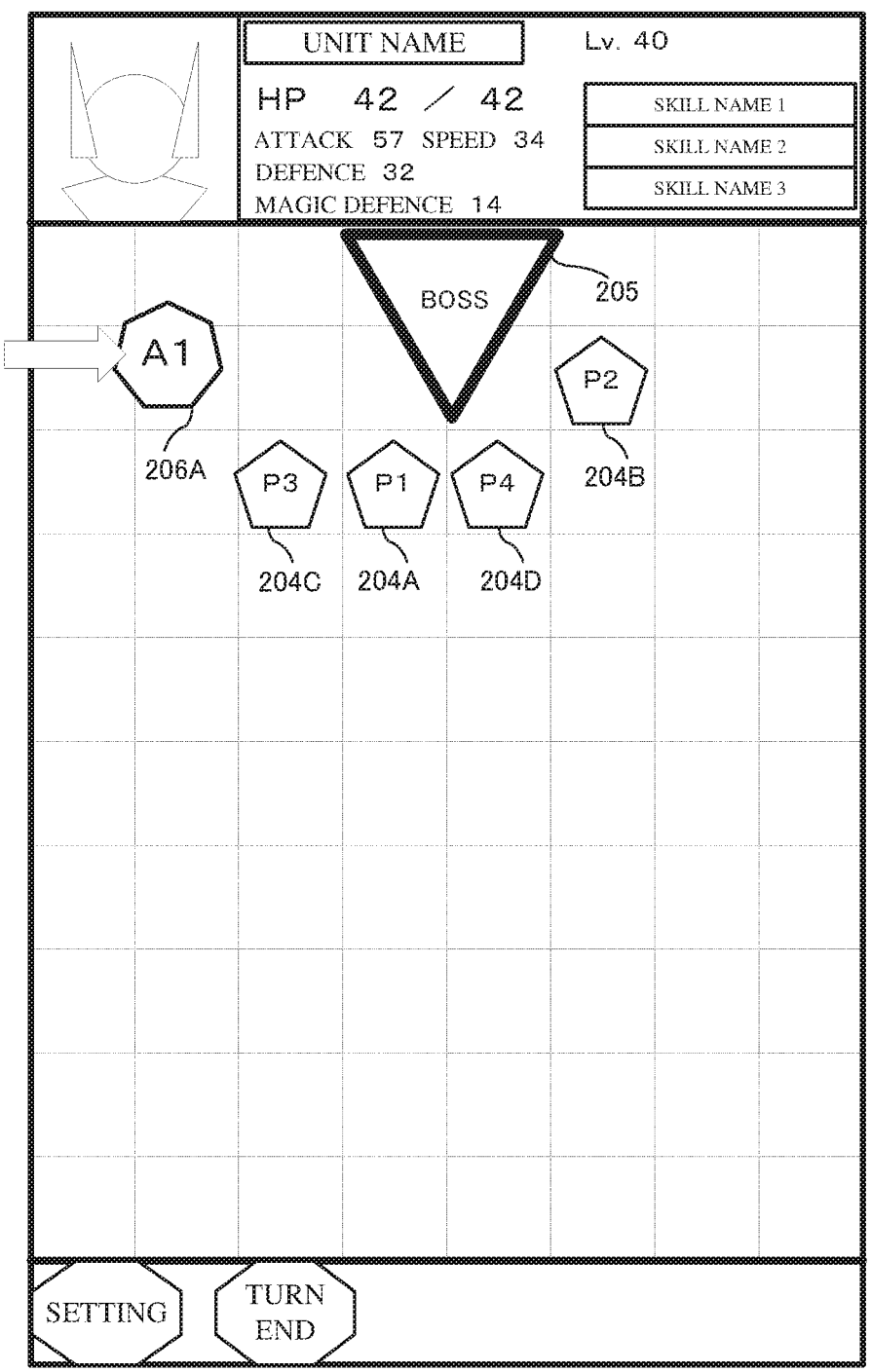
FIG. 9 illustrates a non-limiting example of a game screen.
Figure 10:
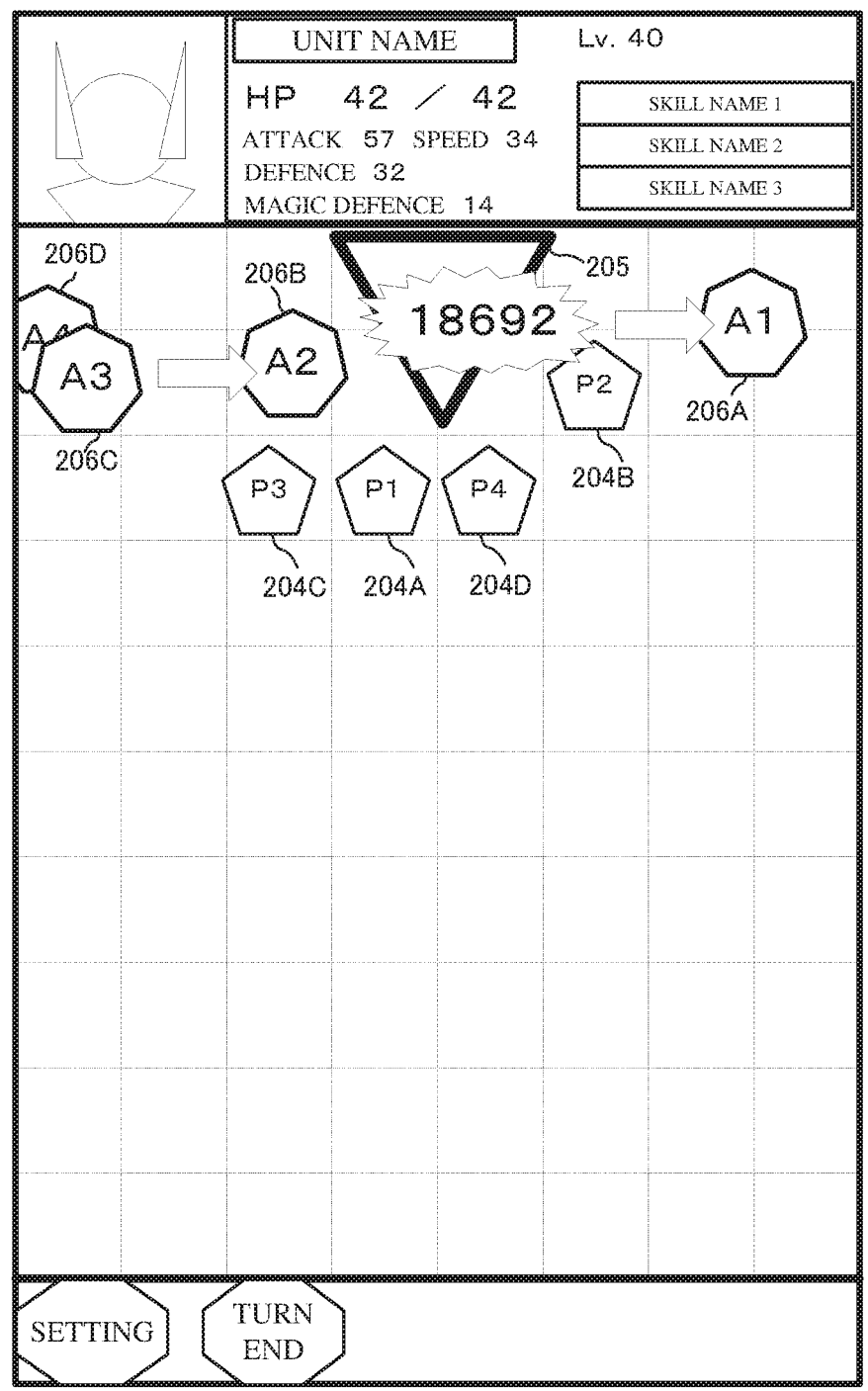
FIG. 10 illustrates a non-limiting example of a game screen.

FIGS. 7 to 10 illustrate screen examples for the additional attack. FIG. 7 illustrates a TBSG screen example at the time of elapse of seven turns. That is, FIG. 7 illustrates a state where the raid boss 205 has not been defeated by the own units 204 within seven turns. In this case, first, a cut-in representation showing "ARRIVAL OF ALLIED ARMY!" shown in FIG. 8 is displayed (an image of a character may be displayed in the cut-in representation). Thereafter, as shown in FIG. 9, at the upper left of the map screen, a first allied army character 206A appears so as to enter from the outside of the screen. Regarding movement of the allied army character 206, the allied army character 206 is displayed not to move along the squares but to move toward the raid boss 205 without being bound by the squares. After the first allied army character 206A appears, the following allied army characters 206B, 206C, and 206D subsequently appear so as to enter from the outside of the screen as shown in FIG. 10. In the exemplary embodiment, up to five allied army characters 206 appear.

Moreover, if each allied army character 206 moves toward the raid boss 205 and comes into contact with the raid boss 205, a representation of attacking the raid boss 205 is performed. Thereafter, each allied army character 206 moves toward the right of the screen and exits the screen. In addition, in FIG. 10, a given damage value is displayed so as to be superimposed on the raid boss 205 and indicates that the first allied army character 206A gives a damage of "18692" to the raid boss 205.

Here, the "allied army" will be described. The "allied army" simply refers to other players. For the allied army characters 206, images of units owned by the other players are used. In other words, if the raid boss 205 is defeated within seven turns, up to five other players further attack the raid boss 205 in the form of an additional attack. Accordingly, a representation that a plurality of players "cooperatively battle" can be provided to the user.

In the exemplary embodiment, players to participate in raid battles are grouped into groups of up to 200 players. Therefore, the players who can be the "allied army" are other players belonging to the same group.

Moreover, for a value of damage given to the raid boss 205 by the allied army character 206, damage (damage except for an additional attack) given to the raid boss 205 by each of other players in the TBSG of each of the other players is used. This will be described later.

As described above, in the exemplary embodiment, each player participating in the raid battle battles against the raid boss 205 in the form of TBSG in the information processing terminal 102. Here, in the process of the exemplary embodiment, as the HP of the raid boss 205 appearing in the TBSG, the HP at a predetermined time in the past is used in principle. In this example, a description will be given with an example using the HP of the raid boss one hour before. Specifically, in the exemplary embodiment, when the player taps the banner image 151 of "EVENT BOSS DEFEATING BATTLE" from the event menu, communication with the server 101 is performed, and the preparation process is executed. In other words, when an operation of selecting participation in a raid battle event (hereinafter, event participation operation) is performed, the preparation process is executed. In this preparation process, the HP of the raid boss one hour before is calculated. The maximum HP (the HP in the initial state) of the raid boss and the history of given damage values transmitted from each terminal as needed are stored in the server 101. Therefore, by using these pieces of information, the HP of the raid boss one hour before can be calculated.

Then, "instance environment data" including information of the HP one hour before is generated by the server 101. The instance environment data is data used for executing the above-described TBSG process in the information processing terminal 102. Such instance environment data is generated individually for each player who has performed the event participation operation, and is stored in the server 101. Such instance environment data is transmitted to the information processing terminal 102. Then, in the information processing terminal 102, a TBSG process in which the raid boss 205 for which the HP one hour before is set appears is performed on the basis of the instance environment data. That is, the HP of the raid boss 205 is managed for each player by using the instance environment data. For convenience of explanation, in the following description, the raid boss 205 that appears in the TBSG in each information processing terminal 102 on the basis of the instance environment data is sometimes referred to as "individual boss", and a raid boss for which an HP is managed by the server 101 and which is referred to upon generation of instance environment data is sometimes referred to as "shared boss". In addition, the HP of the individual boss is referred to as "individual boss HP". Moreover, the HP of the shared boss managed by the server 101 is referred to as "shared boss HP".

A validity period is set for the instance environment data in the exemplary embodiment, and, in this example, the validity period is one hour. Once instance environment data has been generated and its validity period has elapsed, when the event participation operation is performed thereafter, instance environment data based on that time is generated again. In the exemplary embodiment, when the TBSG is performed within the validity period of instance environment data (process for one game ends), the validity period is reset. For example, it is assumed that the actual TBSG starts 20 minutes after instance environment data is generated, and the TBSG for one game ends 30 minutes after the instance environment data is generated. In this case, when the TBSG ends (when communication with the server 101 is performed), the validity period is reset to one hour again. While the validity period continues, the contents of the instance environment data are adopted and used. Therefore, when the TBSG for several games is consecutively performed during the validity period of certain instance environment data, the HP of an individual boss in the validity period is adopted. For example, it is assumed that the HP of the individual boss changes from 10,000 to 9,000 in the first TBSG. Thereafter, when the second TBSG is started consecutively within the validity period, the TBSG is started with the HP of the individual boss being 9,000. On the other hand, when the validity period has elapsed, communication with the server 101 is performed again at the timing when the event participation operation is performed as described above, and the HP of the shared boss one hour before is reset as the HP of the individual boss. In other words, when the instance environment data is generated, the HP one hour before as described above is set as the initial HP of the individual boss. On the other hand, when the instance environment data is generated once and a plurality of plays are performed within the validity period, the HP of the individual boss changed according to the play content of each player is adopted and used.

Here, a supplemental description will be given for the reason why the HP at a predetermined time in the past (one hour before in this example) is used. First, as described above, in this example, when the raid boss 205 is defeated, the defeating player can obtain a special reward called "defeat reward". Therefore, players can aim to defeat the raid boss 205 for the "defeat reward". On the premise that there is such a "defeat reward", the case of using the HP of the raid boss (shared boss) in real time, instead of using the HP of the raid boss one hour before as in this example, is assumed. For example, it is assumed that, as a result of performing one game of the raid battle, the raid boss is not defeated, but the HP of the raid boss is reduced to 100. In this case, it is conceivable that the player tries the raid battle again in order to obtain the "defeat reward". However, if the HP of the raid boss is used in real time, after the one game ends, when an operation for challenging the raid boss again is performed, the raid boss for which the HP remains as 100 may be defeated by another player while communication with the server 101 or the like is being performed. In this case, the player who has tried again for the "defeat reward" may lose the chance of obtaining the "defeat reward", which may lead to a decrease in motivation for the game. Meanwhile, if the game ends when the remaining HP becomes close to 0, the idea that another player will defeat the raid boss will come to mind, so that the player may throw away the chance of challenging again to obtain the defeat reward by themselves. In view of the possibility that such a situation may occur, in the exemplary embodiment, the "HP one hour before" is used to increase the chances that the player can obtain the "defeat reward" and prevent a decrease in motivation for the game and the like.

Furthermore, in the exemplary embodiment, an additional attack by the "allied army" is also performed as described above. As a given damage value used for this additional attack, a given damage value of another player (sent to the server 101) that has occurred within the last one hour based on the time when the event participation operation is performed is used. In the exemplary embodiment, among the given damage values that have occurred within the last one hour, the given damage values of the top-five players in descending order are adopted. Player information about the top-five players, information indicating the given damage values, etc., are included in the instance environment data and transmitted to the information processing terminal 102. Accordingly, when seven turns have elapsed without the individual boss being defeated in the TBSG, allied army characters 206 of other players who are the top-five players in given damage value appear on the basis of the information included in the instance environment data. Then, a presentation that the allied army characters 206 give damage equivalent to the given damage values of the respective players, as an additional attack to the raid boss 205, is performed.

Moreover, in the exemplary embodiment, even when the raid boss 205 is replaced, this additional attack is applied to the raid bosses before and after the replacement. For example, it is assumed that a given damage value by an attack performed by a player A against a raid boss A is adopted for an additional attack in the TBSG of a player B, and the raid boss A has been defeated and replaced by a raid boss B at the time when the player B performs the TBSG. In this case as well, the given damage value of the player A to the raid boss A is used for an additional attack against the raid boss B. In other words, regarding the use of an additional attack, any given damage value that has occurred within the last one hour can be adopted as an additional attack candidate regardless of which raid boss is attacked.

In this example, regarding the information used for the HP of the raid boss 205 and an additional attack, "one hour before" or "within one hour" is used as an example of a time in the past. In another exemplary embodiment, for example, the HP at another time in the past, for example, at a time 30 minutes before or 2 hours before, may be used. A predetermined time in the past may be used in consideration of factors such as the durability setting of the raid boss 205, the number of participants in the event, and the number of active users.

As described above, in the exemplary embodiment, the HP one hour before is used as the HP of the individual boss appearing in the TBSG executed in the information processing terminal 102. Also, regarding the additional attack of the "allied army", the given damage value of another player within the last one hour is used. An example of attacks of players in the raid battle of the exemplary embodiment and flow of change in the HPs of raid bosses (shared boss and individual boss) using such an HP and additional attack will be described with reference to FIG. 11. Here, an example in which three players including a player A, a player B, and a player C participate in the raid battle will be described as one example. In addition, flow, in which a shared boss A appears at 0:00, until the shared boss A is defeated is taken as an example. After the defeat, a shared boss B appears. In addition, the initial value of the HP of the shared boss A is set to 10,000. In addition, before 0:00, damage given by any player has not occurred. In addition, for easy understanding of the description, it is assumed here that each player starts TBSG within one hour after performing the event participation operation.

Figure 11:
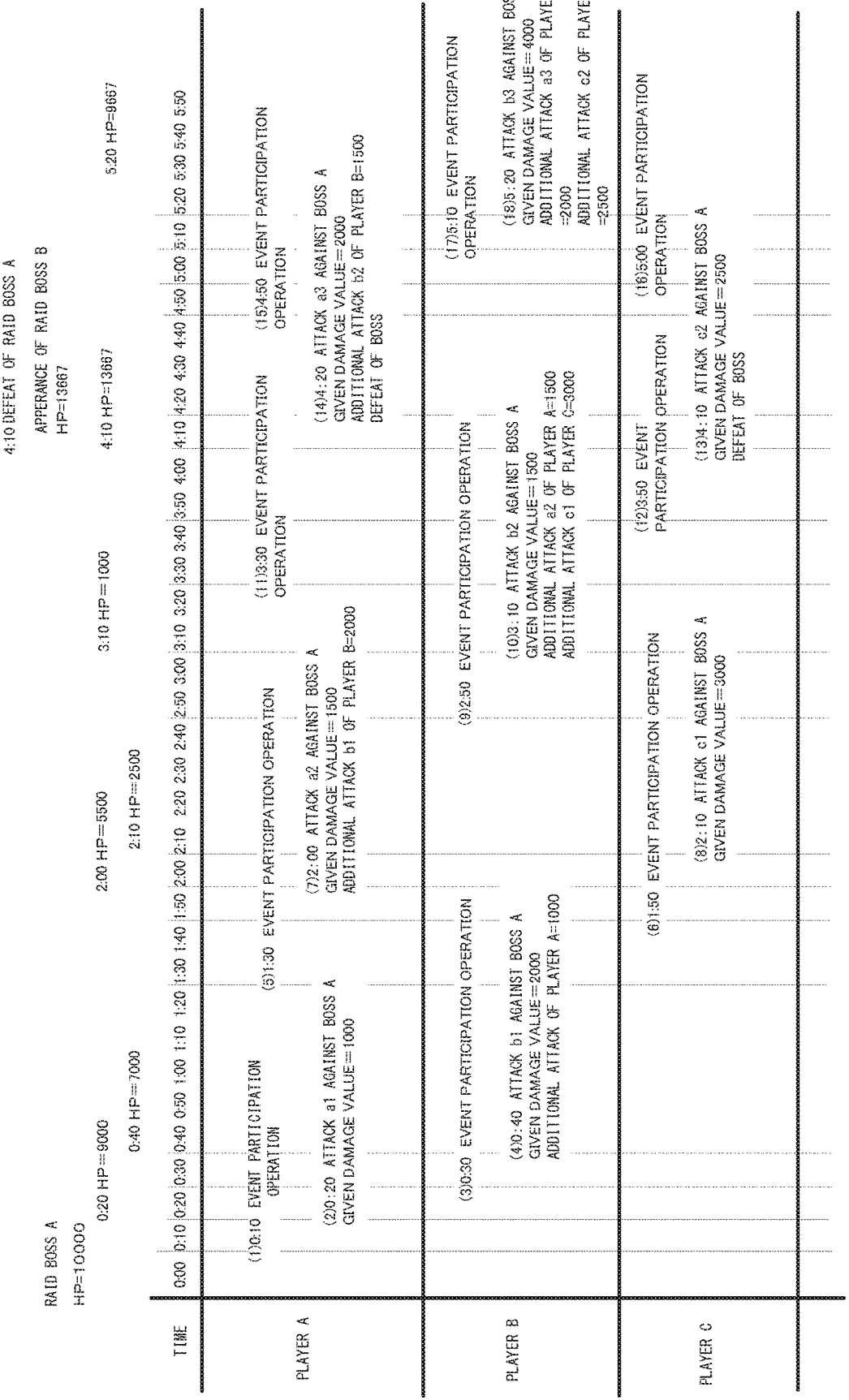
FIG. 11 is a diagram for describing a non-limiting example of attacks of players and flow of change in HPs of raid bosses.

In FIG. 11, first, at (1) 0:10, the player A performs the event participation operation. At this time, the HP of the shared boss A remains as an initial value of 10,000, and the HP one hour before is also used as 10,000. Therefore, the instance environment data including information that "the HP one hour before is 10,000" is generated by the server 101 and transmitted to the information processing terminal 102 of the player A. At this time, given damage of the other players within the last one hour has not occurred, and thus data about an "additional attack" is not included in the instance environment data.

Thereafter, a TBSG process is performed in the information processing terminal 102 of the player A, and at (2) 0:20, a damage of 1,000 is given to an individual boss A by an attack a1 of the player A. Here, the "attack" is a generic term for attacks made in the TBSG for one game. That is, at 0:20, a given damage value of the player A is determined as a result of the end of the TBSG (elapse of seven turns). Then, information of the given damage is transmitted to the server 101, and the shared boss HP is updated in the server 101. That is, at 0:20, the shared boss HP changes to 9,000. As a result of this battle, the player A obtains 1,000 points as a score for the shared boss A.

Next, at (3) 0:30, the player B performs the event participation operation. Based on this time, the HP of the shared boss one hour before is 10,000 (remains as the initial value). Thus, in instance environment data for the player B generated at this time, the "individual boss HP" is set to 10,000. In addition, based on 0:30, within the last one hour, the given damage by the attack a1 of the player A has occurred. Therefore, in the instance environment data for the player B, information about the attack a1 is set as information for the additional attack.

Thereafter, at (4) 0:40, a damage of 2,000 is given to the individual boss A by an attack b1 of the player B. At this time, the individual boss A has not been defeated yet, and thus an additional attack of the player A based on the attack a1 is also performed in the TBSG process of the player B. In addition, information of the given damage by the attack b1 of the player B (a given damage value of 2,000) is transmitted to the server 101. As a result, the shared boss HP is updated in the server 101, and the shared boss HP changes to 7,000 at 0:40. In addition, the player B obtains 2,000 points as a score for the shared boss A.

Next, at (5) 1:30, the player A performs the event participation operation again. At this time, more than one hour has elapsed from 0:20 at which the attack a1 is performed, and thus the validity period of the instance environment data has also elapsed. Therefore, at this time, instance environment data for the player A is generated. Then, the shared boss HP one hour before this time is 9,000, and thus 9,000 is set as the individual boss HP in the instance environment data. In addition, information about the attack b1 of the player B is also set as information for an additional attack.

Next, at (6) 1:50, the player C performs the event participation operation. Since it is the first participation for the player C, instance environment data for the player C is generated. The shared boss HP one hour before this time is 7,000, and thus 7,000 is set as the individual boss HP in the instance environment data. Information for an additional attack is not set, since a given damage of any other player within the last one hour from this time has not occurred.

Next, at (7) 2:00, a damage of 1,500 is given to the individual boss A by an attack a2 of the player A. In addition, in the TBSG process of the player A, an additional attack of the player B based on the attack b1 is also performed. Moreover, the shared boss HP changes to 5,500 on the basis of information of the given damage by the attack a2 (a given damage value of 1,500). Furthermore, 1,500 is added to the score of the player A, and the score of the player A at this time is 2,500 points.

Next, at (8) 2:10, a damage of 3,000 is given to the individual boss A by an attack c1 of the player C. Then, the shared boss HP changes to 2,500 on the basis of information of this given damage. In addition, the player C obtains 3,000 points as a score for the shared boss A.

Next, at (9) 2:50, the player B performs the event participation operation. At this time, more than one hour has elapsed from 0:40 at which the attack b1 is performed, and thus the validity period of the instance environment data has also elapsed. Therefore, instance environment data for the player B is generated again. The shared boss HP at 1:50 which is one hour before this time is 7,000, and thus 7,000 is set as the individual boss HP in the instance environment data. In addition, the attack a2 of the player A and the attack c1 of the player C, which have occurred within the last one hour (after 1:50), are set as information for an additional attack.

Next, at (10) 3:10, a damage of 1,500 is given to the individual boss A by an attack b2 of the player B. In addition, in the TBSG process of the player B, an additional attack of the player A based on the attack a2 and an additional attack of the player C based on the attack c1 are also performed (that is, two allied army characters 206 appear). Moreover, the shared boss HP changes to 1,000 on the basis of information of the given damage by the attack b2 (a given damage value of 1,500). Furthermore, 1,500 is added to the score of the player B, and the total score of the player B at this time is 3,500 points.

Next, at (11) 3:30, the player A performs the event participation operation. More than one hour has elapsed from 2:00 at which the attack a2 is performed, and the validity period of the instance environment data has also elapsed. Thus, instance environment data for player A is generated again. The shared boss HP at 2:30 which is one hour before this time is 2,500, and thus 2,500 is set as the individual boss HP in the instance environment data. In addition, the attack b2 of the player B, which has occurred within the last one hour, is set as information for an additional attack.

Next, at (12) 3:50, the player C performs the event participation operation. More than one hour has elapsed from 2:10 at which the last attack c1 is performed, and thus instance environment data for player C is generated again. The shared boss HP at 2:50 which is one hour before this time is 2,500, and thus 2,500 is set as the individual boss HP in the instance environment data. In addition, the attack b2 of the player B, which has occurred within the last one hour (after 2:50), is set as information for an additional attack.

Next, at (13) 4:10, a damage of 2,500 is given to the individual boss A by an attack c2 of the player C. Since the individual boss HP of the player C is 2,500, the player C defeats the individual boss A at this time. Then, the shared boss HP becomes 0 on the basis of information of this given damage. As a result, it is also determined in the server 101 that the shared boss A has been defeated, and the next shared boss B is set as the "present raid boss". As a result, at 4:10, the shared boss B appears. It is assumed that the initial value of the HP of the shared boss B is 13667 which is higher than that of the shared boss A. The player C obtains a score of 5,500 points in total for the shared boss A. In addition, the player C also obtains a defeat reward for the shared boss A.

Next, at (14) 4:20, a damage of 2,000 is given to the individual boss A by an attack a3 of the player A. Furthermore, a damage of 1,500 is also added by an additional attack b2 of the player B. Since the individual boss HP of the player A is 2,500, the player A defeats the individual boss A by the additional attack b2 of the player B. That is, aside from the raid boss defeat by the player C, a raid boss defeat by the player A occurs. Thus, the player A can also obtain a defeat reward. Here, the given damage value by the attack a3 is transmitted to the server 101, but the raid boss is replaced by the shared boss B at 4:10. Then, in the exemplary embodiment, the given damage value by the attack a3 is not reflected in the shared HP of the shared boss B. However, in another exemplary embodiment, a given damage value to a previous raid boss that occurs after a new raid boss appears may be used as a given damage value to the present raid boss, and may be subtracted from the shared boss HP. When this is applied to the above example, the given damage value by the attack a3 may be reflected in the shared boss HP of the shared boss B. In this case, the shared boss HP of the shared boss B changes to 11667 at 4:20.

Next, at (15) 4:50, the player A performs the event participation operation. This time is within one hour (within the validity period) from 4:20 at which the attack a3 is performed, but the player A has defeated the individual boss A, and raid boss replacement has also occurred. Thus, instance environment data for the player A that includes information of an individual boss B set on the basis of the shared boss B is generated. In addition, the attack c2 of the player C, which has occurred within the last one hour (after 3:50), is set as information for an additional attack.

Next, at (16) 5:00, the player C performs the event participation operation. In this case as well, since the player C has defeated the raid boss A, and raid boss replacement has also occurred, instance environment data for the player C based on the raid boss B is generated. The attack a3 of the player A, which has occurred within the last one hour (after 4:00), is set as information for an additional attack.

Next, at (17) 5:10, the player B performs the event participation operation. Since raid boss replacement has occurred, instance environment data for the player B that includes information of the individual boss B is similarly generated. The attack a3 of the player A and the attack c2 of the player C, which have occurred within the last one hour (after 4:10), are set as information for an additional attack.

Next, at (18) 5:20, a damage of 4,000 is given to the individual boss B by an attack b3 of the player B. Furthermore, in the TBSG process of the player B, an additional attack of the player A based on the attack a3 and an additional attack of the player C based on the attack c2 are also performed. In addition, the shared boss HP of the shared boss B changes to 9667 on the basis of information of the given damage by the attack b3 (a given damage value of 4,000). Moreover, a score is accumulated for each shared boss, and thus the player B obtains 4,000 points as a score for the shared boss B.

As described above, in the exemplary embodiment, the TBSG of each player is performed using the HP of the shared boss one hour before and a given damage value by another player within the last one hour. Accordingly, the chances of obtaining the defeat reward for the raid boss can be increased, and a sense of cooperative battle in which the player is battling against the raid boss in cooperation with other players can also be provided to the player.

Regarding setting of information for an additional attack, in the exemplary embodiment, the example in which all attacks that have occurred within the last one hour are setting candidates has been described. As an example, the example in which the attack b2 of the player B can be used for both an additional attack in the TBSG of the player A and an additional attack in the TBSG of the player C has been described. In another exemplary embodiment, an attack that has already been used as an additional attack for another player may be excluded from setting candidates For example, the case where, upon generation of the instance environment data for the player C, given damage by the player A has occurred within the last one hour and has already been set for an additional attack in the TBSG of the player B, is assumed. In this case, since the given damage by the player A has already been used, the given damage by the player A may be excluded from setting candidates. Accordingly, it is possible to prevent the players appearing as the "allied army" from being fixed to, for example, the top-five players in amount of damage, and allow characters of various other players to appear as the "allied army".

[Details of Game Processing of Exemplary Embodiment]

Next, the raid battle game processing in the exemplary embodiment will be described in more detail with reference to FIGS. 12 to 21.

[Data To Be Used]

Figure 12:
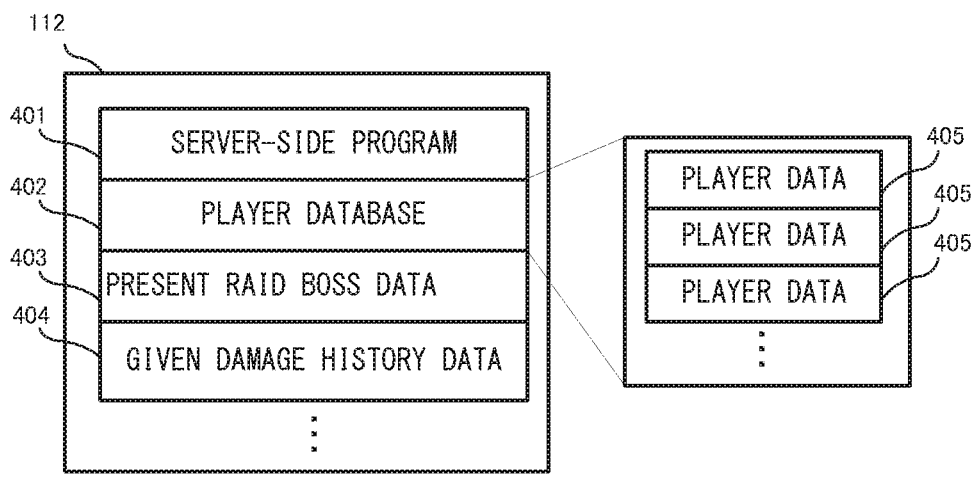
FIG. 12 illustrates a non-limiting example of data stored in a memory 112 of the server 101.

First, various data to be used in the TBSG process will be described. First, data to be used in the server 101 will be described. FIG. 12 illustrates a memory map showing an example of various data stored in the memory 112 of the server 101. In the memory 112 of the server 101, a server-side program 401, a player database 402, present raid boss data 403, given damage history data 404, etc., are stored.

The server-side program 401 is a program for executing processes regarding the TBSG according to the exemplary embodiment. Specifically, the server-side program 401 is a program for executing processes in the flowcharts shown in FIGS. 19 and 21 described later.

The player database 402 is data about each player who plays the raid battle according to the exemplary embodiment. In the exemplary embodiment, the player database 402 includes a plurality of pieces of player data 405.

Figure 13:
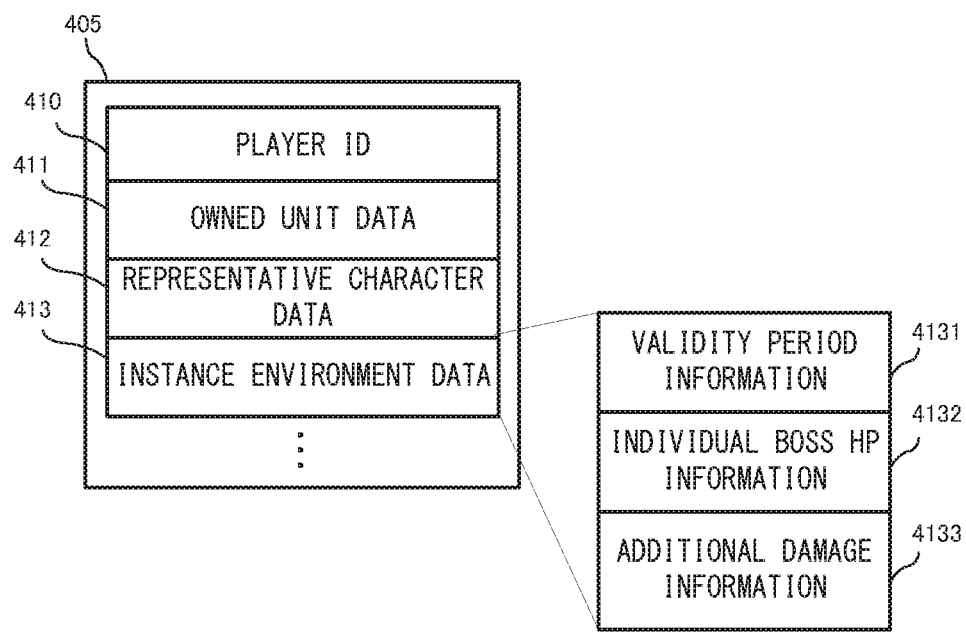
FIG. 13 illustrates a non-limiting example of the data structure of player data 405.

FIG. 13 illustrates an example of the data structure of the player data 405. The player data 405 shown in FIG. 13 includes a player ID 410, owned unit data 411, representative character data 412, instance environment data 413, etc. The player ID 410 is an ID for uniquely identifying each player. The owned unit data 411 is data indicating units owned by the player (units that can be used as the own units 204). The representative character data 412 is data indicating one unit set as a "representative character" among the units owned by the player. The unit indicated here is used as the allied army character 206.

The instance environment data 413 is data to be used in the TBSG process executed in each information processing terminal 102 as described above. The instance environment data 413 includes at least validity period information 4131, individual boss HP information 4132, and additional damage information 4133.

The validity period information 4131 is information indicating the validity period of the instance environment data. For example, when the instance environment data 413 is generated at 1:00:00, the date and time of the validity period is set to 1:59:59 in the validity period information 4131. In addition, when the TBSG is consecutively performed within the validity period in the information processing terminal 102, for example, the validity period is updated at a timing when information of a given damage value is transmitted to the server 101.

The individual boss HP information 4132 is information for indicating the HP of an individual boss (raid boss 205) appearing in the TBSG in each information processing terminal. When the instance environment data is generated, the individual boss HP information 4132 is set on the basis of the HP of the shared boss one hour before as described above. Meanwhile, within the validity period, the individual boss HP information 4132 is updated as appropriate to a content reflecting a result of the TBSG in each information processing terminal 102. For example, if the TBSG is started from a state where the individual boss HP is 5,000, and a given damage by the player A is 1,000 and a damage of 1,000 has been given by an additional attack when the TBSG ends (after elapse of seven turns and the end of an additional attack process), the individual boss HP information 4132 is updated to a value of 3,000. In other words, the individual boss HP information 4132 has the following two properties. First, the individual boss HP information 4132 has a property as information indicating the initial value (HP at the time of the first play) of the individual boss HP in the TBSG using certain instance environment data. Secondly, the individual boss HP information 4132 has a property as information indicating a present value of the individual boss HP for each player, which can be a different value for each player, in the second or subsequent TBSG play using the instance environment data. Therefore, in the information processing terminal 102, if the TBSG is started outside the validity period, the HP one hour before is acquired as the initial value of the individual boss HP from the server 101. In addition, if the TBSG is started (consecutively) within the validity period, the HP of the individual boss at the end of the last TBSG play is acquired from the server 101.

The additional damage information 4133 is information for performing an additional attack as described above in the TBSG in each information processing terminal 102. In the exemplary embodiment, of the given damage values that have occurred within the last one hour after the event participation operation is performed as described above, the given damage values of up to the top-five players in descending order are used. Therefore, the additional damage information 4133 includes at least the player ID 410 indicating each of these players, the representative character data 412 (information required for displaying the allied army character 206) of each player, and information indicating the given damage value of each player.

Figures 14, 15:
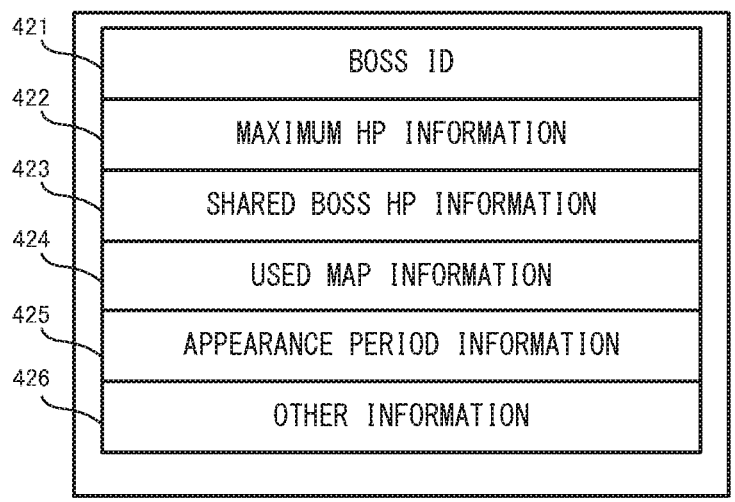
FIG. 14 illustrates a non-limiting example of the data structure of present raid boss data 403.
FIG. 15 illustrates a non-limiting example of the data structure of given damage history data 404.

Referring back to FIG. 12, the present raid boss data 403 is data about the presently appearing shared boss. FIG. 14 illustrates an example of the data structure of the present raid boss data 403. The present raid boss data 403 includes at least a boss ID 421, maximum HP information 422, shared boss HP information 423, used map information 424, appearance period information 425, and other information 426. The boss ID 421 is an ID for uniquely identifying the shared boss. The maximum HP information 422 is information indicating the maximum value of the HP of the shared boss, and is used as the initial value of the HP when the boss appears. The shared boss HP information 423 is information indicating the present HP of the shared boss. That is, the shared boss HP information 423 is information indicating the latest HP reflecting a given damage value transmitted from each information processing terminal 102. The used map information 424 is information for specifying a map in which the shared boss appears. A map to be used in the TBSG is determined on the basis of the information designated here. The appearance period information 425 is information that defines a period for which the shared boss appears. Even when the HP of the shared boss has not been 0 (the shared boss has not been defeated), if the period set here has elapsed, raid boss replacement is performed. The other information 426 is, for example, information that defines attacking power, skills to be used, etc., of the shared boss.

Referring back to FIG. 12, the given damage history data 404 is data obtained by accumulating information of a given damage value transmitted from each information processing terminal 102. That is, the given damage history data 404 is data in which information about given damage that has occurred is recorded as history. FIG. 15 illustrates an example of the data structure of the given damage history data 404. The given damage history data 404 is data in a table format including at least items such as time information 431, a player ID 432, and a given damage value 433. The time information 431 is used as a time stamp, and is information indicating the time when information of a given damage value is transmitted (substantially, can be considered as information indicating the time when a certain player attacks a raid boss). The player ID 432 is information for identifying the player who has transmitted the given damage value. That is, the player ID 432 is information indicating the player who has caused the given damage. The given damage value 433 is information indicating a value of damage given to a certain raid boss by the player indicated by the player ID 432. The given damage history data 404 is data in which the time when the given damage has occurred is recorded as history, and, in the exemplary embodiment, which raid boss the damage has been given to is not recorded therein.

Figure 16:
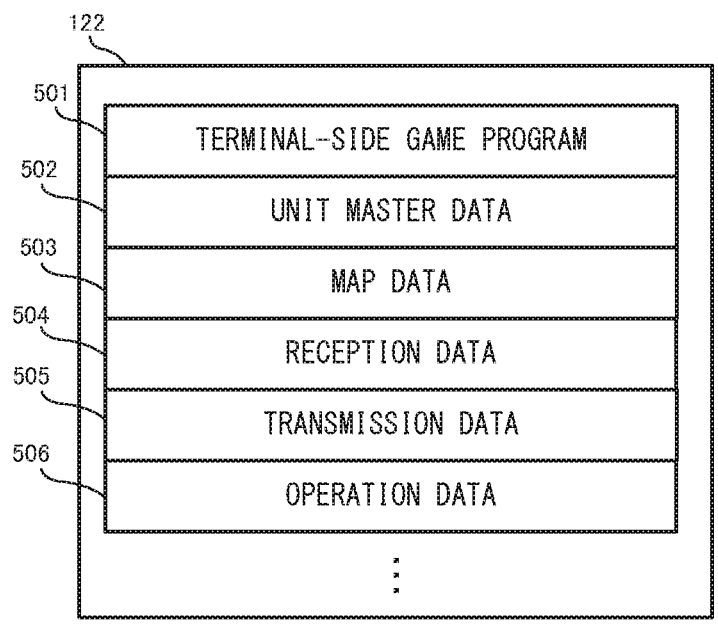
FIG. 16 illustrates a non-limiting example of data stored in a memory 122 of the information processing terminal 102.

Next, various data stored in the memory 122 of the information processing terminal 102 will be described. FIG. 16 illustrates a memory map showing an example of various data stored in the memory 122 of the information processing terminal 102. In the memory 122 of the information processing terminal 102, a terminal-side game program 501, unit master data 502, map data 503, reception data 504, transmission data 505, operation data 506, etc., are stored.

The terminal-side game program 501 is a program for executing processes for the raid battle of the exemplary embodiment.

The unit master data 502 is data that defines all units that appear in the TBSG. For example, the unit master data 502 includes information that defines the performance of each unit, image data of each unit, etc.

The map data 503 is data that defines a map to be used in the TBSG. In the exemplary embodiment, information of a plurality of maps is defined, and any of the maps is selected in accordance with the used map information 424 and used in the TBSG.

The reception data 504 is data received from the server 101. Specifically, the reception data 504 includes at least the instance environment data 413 received from the server 101. In addition, the reception data 504 also includes various data required in processes for the raid battle of the exemplary embodiment.

Figure 17:
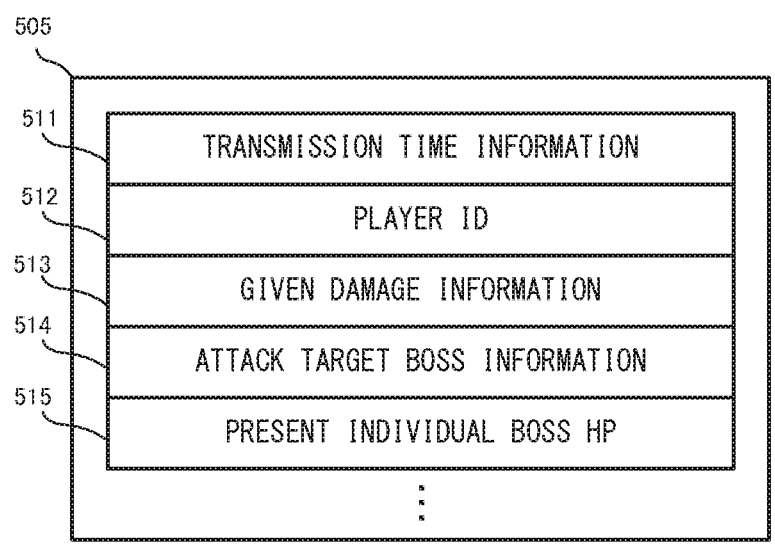
FIG. 17 illustrates a non-limiting example of the data structure of transmission data 505.

The transmission data 505 is data to be transmitted to the server 101. Specifically, the transmission data 505 includes information indicating a given damage value, etc. FIG. 17 illustrates an example of the data structure of the transmission data 505. The transmission data 505 includes transmission time information 511, a player ID 512, given damage information 513, attack target boss information 514, present individual boss HP 515, etc. The transmission time information 511 is data (time stamp) indicating the date and time when the transmission data 505 is transmitted. The player ID 512 is information for identifying the player who has transmitted the transmission data 505. The given damage information 513 is information indicating damage given to an individual boss by the player in one game related to the transmission data 505. Damage by an additional attack performed in the TBSG is not included in the given damage information 513. The attack target boss information 514 is information for identifying the individual boss to which the damage is given by the player. The present individual boss HP 515 is information indicating the individual boss HP, at the time when one game ends, reflecting the damage by an additional attack. If this value is 0, it indicates that the player defeats the individual boss in the TBSG performed on the information processing terminal 102.

Referring back to FIG. 16, the operation data 506 is data indicating the content of an operation performed by the player on the operation section 123.

In addition, in the memory 122, various kinds of working data to be used in the process, etc., are also stored as appropriate.

[Overall Flow of Process]

Figure 18:
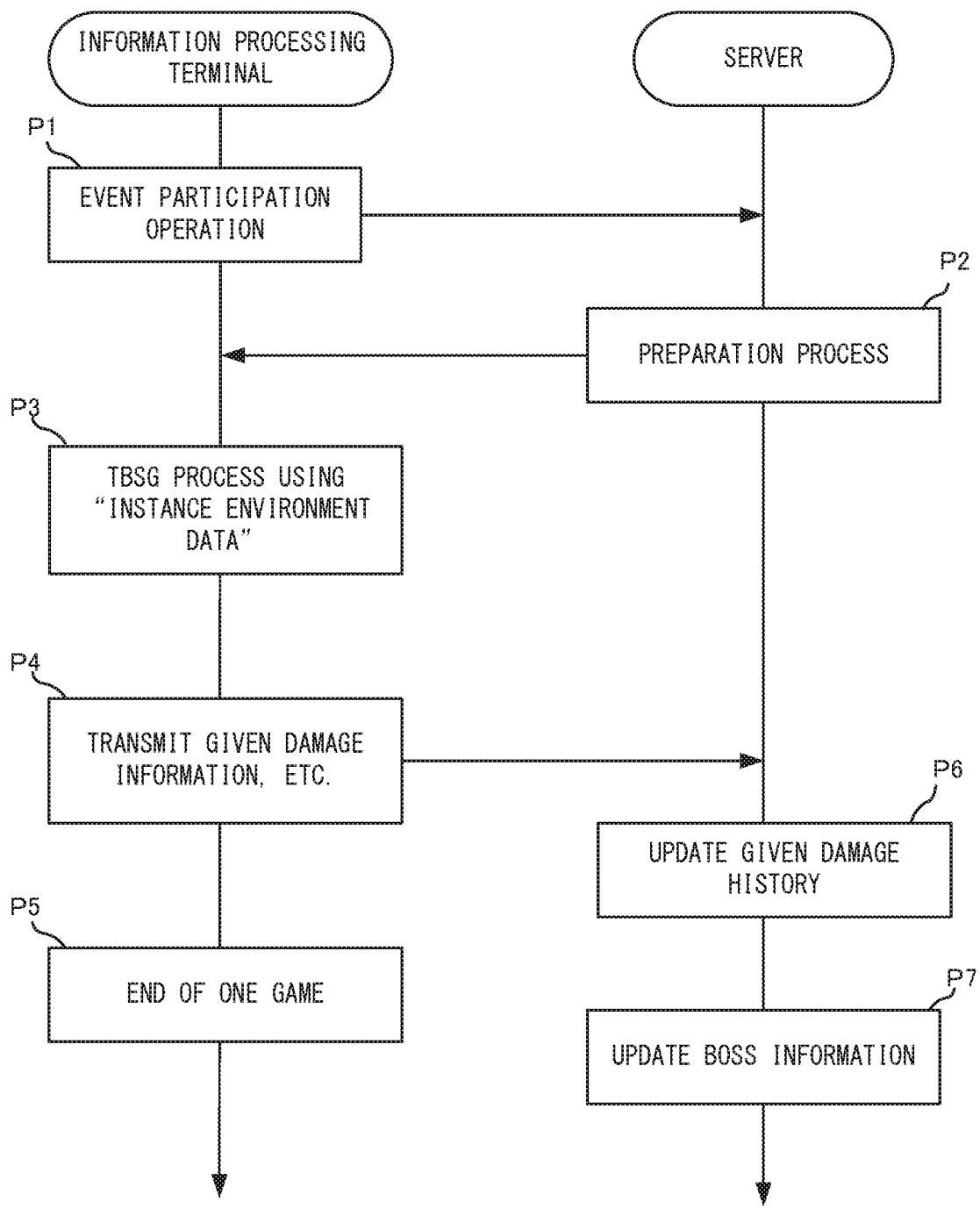
FIG. 18 is a diagram for describing a non-limiting example of overall flow of a raid battle process.

Next, the overall flow of a process for a raid battle executed in cooperation with the server 101 and the information processing terminal 102 will be described with reference to FIG. 18. In FIG. 18, a process of the information processing terminal 102 is shown at the left side of the drawing, and a process of the server 101 is shown at the right side of the drawing.

First, in the information processing terminal 102, the event participation operation is performed, and information indicating that this operation has been performed is transmitted together with the player ID, etc., to the server 101 (P1). Accordingly, in the server 101, a preparation process for performing the TBSG in the information processing terminal 102 is executed. Specifically, a process of preparing the above-described instance environment data is performed. Furthermore, the instance environment data is transmitted to the information processing terminal 102 (P2). Next, in the information processing terminal 102, a TBSG process based on the instance environment data is executed (P3). After the TBSG process ends, given damage information that is information of damage given to a raid boss in this TBSG, etc., are transmitted to the server 101 (P4). This is the end of the process for one game in the information processing terminal 102 (P5).

In the server 101, history data of given damage information of each player is updated on the basis of the transmitted given damage information, etc. (P6). Furthermore, the shared boss HP of the presently appearing shared boss is updated on the basis of the given damage information. In addition, if the shared boss is defeated, a process of causing the next shared boss to appear is also executed.

[Details of Preparation Process Performed in Server 101]

Figure 19:
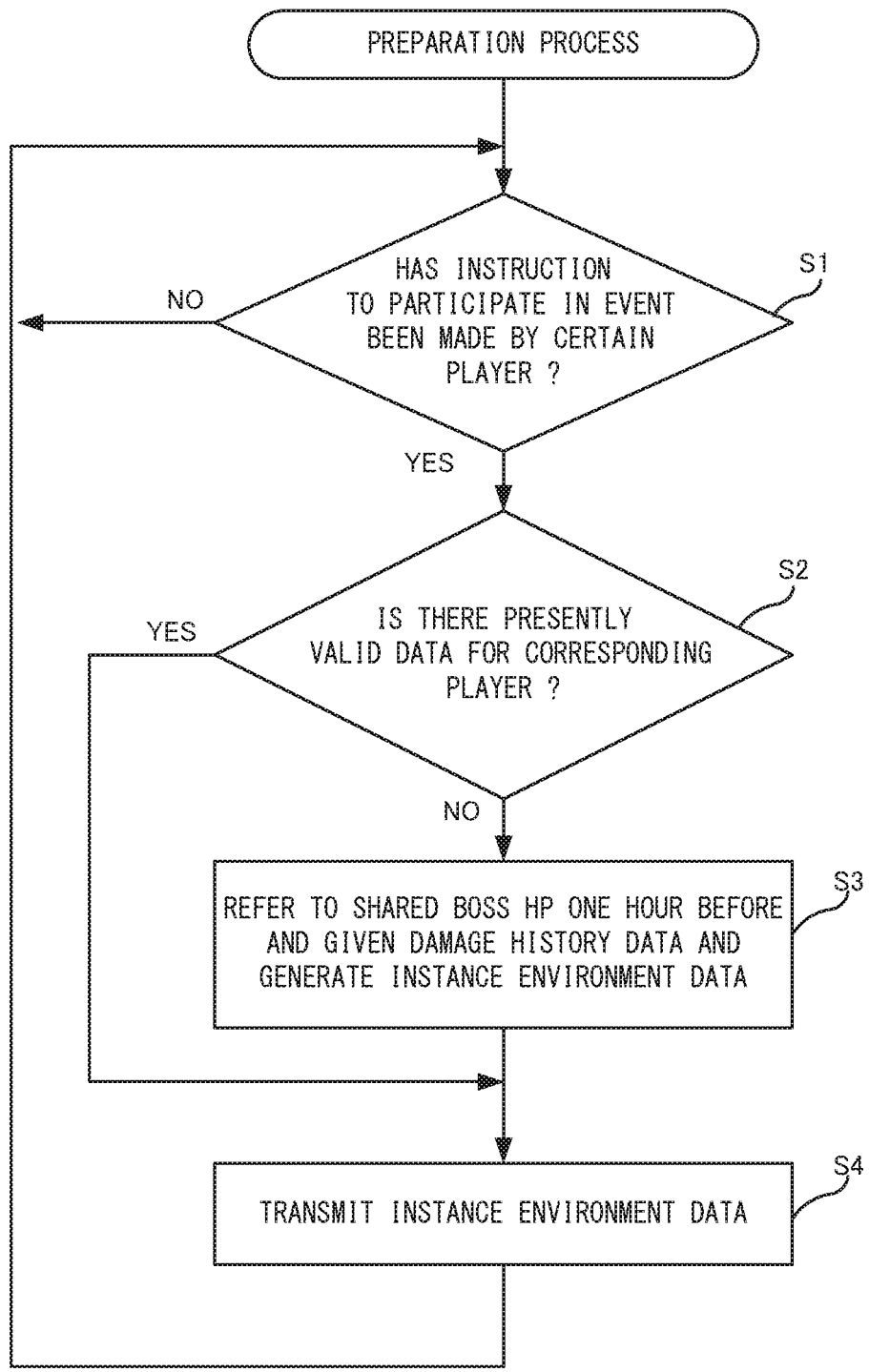
FIG. 19 is a flowchart showing a non-limiting example of a preparation process in detail.

Next, each of the processes executed in the server 101 and each information processing terminal 102 will be described in detail. First, the preparation process of the server 101 related to the process P2 in FIG. 18 will be described. This process is executed in accordance with the event participation operation being performed. FIG. 19 is a flowchart showing the preparation process in detail. First, in step S1, the processor 111 of the server 101 determines whether an instruction to participate in an event has been made by a certain player. That is, the processor 111 determines whether information indicating that the event participation operation has been performed has been transmitted from a certain information processing terminal 102. As a result of the determination, if the instruction has not been made (NO in step S1), the processor 111 continues to wait for the instruction. On the other hand, if the instruction has been made (YES in step S1), in step S2, the processor 111 identifies the player who has performed the event participation operation. Furthermore, the processor 111 refers to the player database 402 and determines whether there is presently valid data that is the instance environment data 413 corresponding to the identified player. As a result of the determination, if there is presently valid data (YES in step S2), the processor 111 advances the processing to step S4. On the other hand, if there is no valid data (NO in step S2), in step S3, the processor 111 executes a process of generating the instance environment data 413. First, the processor 111 sets the individual boss HP information 4132. That is, for the presently appearing shared boss, the processor 111 calculates the HP one hour before the time when the event participation operation is performed. This HP is calculated, for example, on the basis of the maximum HP information 422 and the given damage history data 404. Then, the processor 111 sets the calculated HP as the individual boss HP information 4132. Furthermore, the processor 111 also sets the additional damage information 4133. Specifically, the processor 111 refers to the given damage history data 404 and extracts information of given damage that has occurred within the last one hour from the time when the event participation operation is performed. Furthermore, the processor 111 identifies up to the top-five players in descending order of given damage value on the basis of the extracted information. Then, the processor 111 sets the additional damage information 4133 on the basis of information of the identified players and their given damage. In addition, the processor 111 sets, for example, the date and time one hour after the time when the event participation operation is performed, as the validity period information 4131. Moreover, information about the presently appearing shared boss, such as the boss ID 421 and the used map information 424, is also set in the instance environment data 413 as appropriate. Then, the processor 111 stores the instance environment data 413 set as described above, in the memory 112.

Next, the processor 111 reads out the instance environment data 413 from the memory 112 and transmits the instance environment data 413 to the player who has performed the event participation operation (the information processing terminal 102). Thereafter, the processor 111 returns to step S1 and repeats the process. This is the end of the description of the preparation process.

[Details of Process for One Game Performed in Information Processing Terminal]

Figure 20:
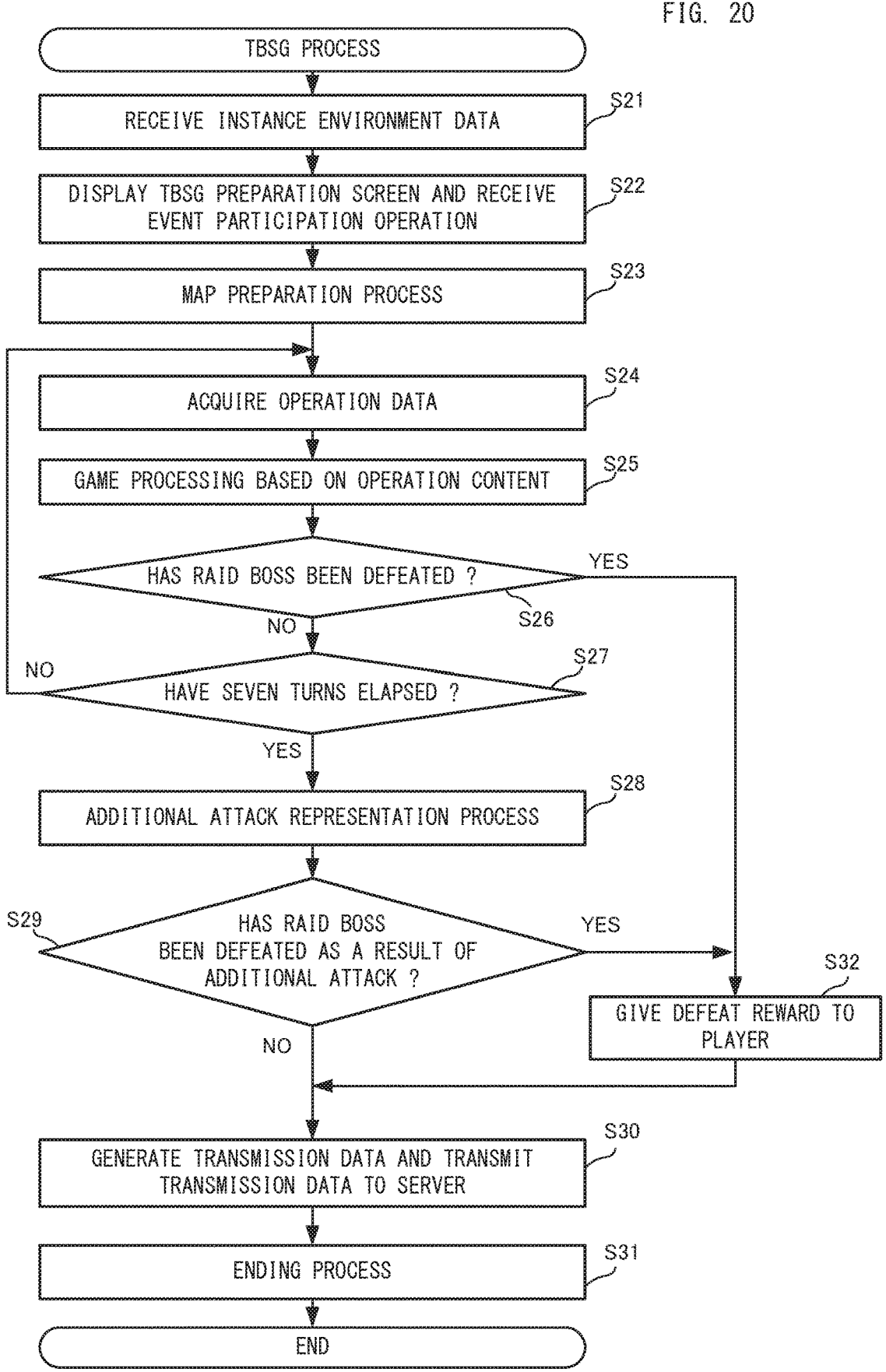
FIG. 20 is a flowchart showing a non-limiting example of a TBSG process in detail.

Next, a TBSG process for one game performed in the information processing terminal 102 will be described. The TBSG process corresponds to the processes P3 to P5 in FIG. 18. FIG. 20 is a flowchart showing the TBSG process in detail. First, in step S21, the processor 121 of the information processing terminal 102 receives the instance environment data 413, etc., from the server 101 and stores the instance environment data 413, etc., as the reception data 504. Then, in step S22, the processor 121 generates a TBSG preparation screen as shown in FIG. 5 and displays the TBSG preparation screen. At this time, the individual boss HP may be displayed as information of an individual boss on the basis of the instance environment data 413. Thereafter, the processor 121 waits for a TBSG start instruction operation (a tap operation on the "SORTIE" button 152) by the player. When the operation is performed, the processor 121 proceeds to the next process.

Next, in accordance with the TBSG start instruction operation being performed by the player, the processor 121 executes a map preparation process for starting the TBSG, in step S23. That is, the processor 121 sets a map to be used in the TBSG, on the basis of the received instance environment data 413. In addition, the processor 121 disposes an individual boss (raid boss 205) at a predetermined position on the map. Furthermore, the processor 121 also disposes the own units 204 at predetermined positions on the map on the basis of an operation by the player. Then, the processor 121 generates a game image as shown in FIG. 6 and displays the game image on the display section 124.

Next, in step S24, the processor 121 acquires operation data. Subsequently, in step S25, the processor 121 executes game processing based on the operation content indicated by the operation data 506. That is, movement control of the own units 204, a process of attacking the raid boss, etc., are performed.

Next, in step S26, the processor 121 determines whether the individual boss has been defeated as a result of the game processing in step S25. That is, the processor 121 determines whether the individual boss has been defeated only by an attack of the own units 204. As a result of the determination, if the individual boss has been defeated (YES in step S26), in step S32, the processor 121 executes a process for giving a defeat reward to the player. Thereafter, the processor 121 advances the processing to step S30 described later.

On the other hand, as a result of the determination in step S26, if the individual boss has not been defeated yet (NO in step S26), the processor 121 determines in step S27 whether seven turns have elapsed. As a result of the determination, if seven turns have not elapsed yet (NO in step S27), the processor 121 returns to step S24 and repeats the process.

On the other hand, if seven turns have elapsed (YES in step S27), subsequently, in step S28, the processor 121 executes a process of performing a representation of an additional attack as described above. Specifically, the processor 121 refers to the additional damage information 4133 included in the received instance environment data 413 and prepares an allied army character 206. Then, the processor 121 executes a process for the allied army character 206 to make an additional attack against the individual boss, while performing a representation display as described with reference to FIGS. 8 to 11. If the content of the additional damage information 4133 is empty, the processor 121 does not perform this additional attack process.

Next, in step S29, the processor 121 determines whether the individual boss has been defeated as a result of the additional attack. As a result of the determination, if the individual boss has been defeated (YES in step S29), the processor 121 proceeds to the process in step S32 and executes the process of giving a defeat reward.

On the other hand, if the individual boss has not been defeated even by the additional attack (NO in step S29), in step S30, the processor 121 executes a process of generating the transmission data 505 and transmitting the transmission data 505 to the server 101. Specifically, first, the processor 121 sets the given damage information 513. That is, the processor 121 calculates the sum of values of damage given by the player to the individual boss using the own units 204 in the game for this time, and sets the sum as the given damage information 513. Furthermore, the processor 121 sets the HP of the individual boss also reflecting the result of the additional attack, as the present individual boss HP 515. Moreover, the processor 121 sets information (boss ID 421) for identifying the individual boss that has battled this time, in the attack target boss information 514. Moreover, the processor 121 also sets the player ID 512 for identifying the player. In addition, the processor 121 sets required information, such as the transmission time information 511, in the transmission data 505 as appropriate. Then, the processor 121 transmits the transmission data 505 to the server 101.

Next, in step S31, the processor 121 executes a process for ending the TBSG for this time. For example, the processor 121 executes a process of displaying, for example, a result screen showing the battle result for this time, or the like, and then shifting to a menu screen. This is the end of the TBSG process for one game.

[Details of Update Process in Server 101]

Figure 21:
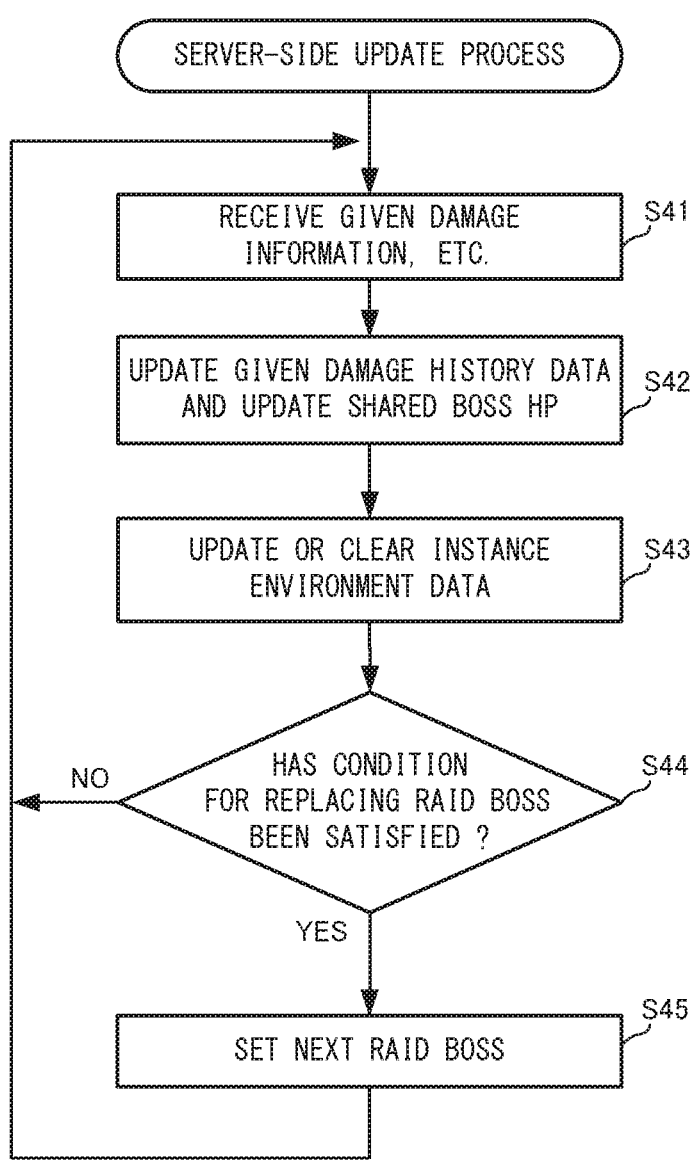
FIG. 21 is a flowchart showing a non-limiting example of a server-side update process in detail.

Next, a server-side update process that is a process corresponding to the processes P6 and P7 in FIG. 18 will be described in detail. FIG. 21 is a flowchart showing the server-side update process in detail. First, in step S41, the processor 111 of the server 101 executes a process of receiving the transmission data 505 transmitted from a certain information processing terminal 102. That is, the processor 111 executes a process of receiving information of given damage caused by each player, etc.

Next, in step S42, the processor 111 updates the given damage history data 404 on the basis of the data received in step S41. Specifically, the processor 111 adds the contents of the transmission time information 511, the player ID 512, and the given damage information 513 included in the transmission data 505, to the given damage history data 404. Furthermore, the processor 111 updates the content of the shared boss HP information 423 on the basis of the given damage history data 404. Here, as described above, given damage to the raid boss that has occurred in a certain information processing terminal 102 after raid boss replacement is not reflected for the raid boss after the replacement in this example (determination as to this is performed using the attack target boss information 514). However, in another exemplary embodiment, even given damage to the previous raid boss may be reflected as given damage to the presently appearing raid boss.

Next, in step S43, the processor 111 updates or clears the instance environment data 413 on the basis of the data received in step S41. Specifically, the processor 111 identifies the player for which update is to be performed, on the basis of the data received in step S41. Next, the processor 111 updates the content of the instance environment data 413 for this player on the basis of the data received in step S41. That is, the processor 111 updates the individual boss HP information 4132 with the content of the present individual boss HP 515. Accordingly, when the player consecutively challenges the raid battle within the validity period, it is possible to adopt the individual boss HP at the end of the last TBSG and play.

Moreover, the processor 111 also updates the validity period information 4131 to the content indicating the date and time one hour after this time. In the exemplary embodiment, the additional damage information 4133 is not updated at this time. However, in another exemplary embodiment, the content of the additional damage information 4133 may be updated at this timing. That is, the processor 111 may extract given damage values by other players within the last one hour from this time and update the content of the additional damage information 4133 on the basis of information of the top-five players in given damage value.

Here, if the present individual boss HP 515 is 0, it means that a defeat of the individual boss has occurred in the TBSG process of the player. In this case, the processor 111 does not perform the above-described update and clears the content of the instance environment data 413. Accordingly, for example, even if consecutive challenges are made within the validity period, the processor 111 can forcedly update the instance environment data 413 to one using a newly appearing shared boss. That is, after the player defeats a certain raid boss, if the player consecutively challenges the raid battle within the validity period, the player can be caused to battle against the next appearing raid boss.

Next, in step S44, the processor 111 determines whether a condition for replacing the presently appearing shared boss has been satisfied. As a result of the determination, if the condition has been satisfied (YES in step S44), in step S45, the processor 111 performs a process of setting the next shared boss. That is, the processor 111 generates a new shared boss and sets contents of the present raid boss data 403 indicating the shared boss.

Here, some specific examples of the "condition for replacing" will be described. First, in the exemplary embodiment, the appearance period of the shared boss is defined in advance as the appearance period information 425. Therefore, if the appearance period has elapsed without defeating the shared boss, it is determined that the "condition for replacing" has been satisfied.

In addition, also when the HP of the shared boss indicated by the shared boss HP information 423 has changed to 0 as a result of update of the given damage history data 404, the presently appearing raid boss is considered as being defeated, and it is determined that the "condition for replacing" has been satisfied.

Moreover, even if the HP indicated by the shared boss HP information 423 is not 0, when a defeat of the individual boss for the first time has occurred in any information processing terminal 102, it may be determined that the "condition for replacing" has been satisfied. For example, when the transmission data 505 for the presently appearing shared boss in which the present individual boss HP 515 is "0" is received for the first time, it may be determined that the "condition for replacing" has been satisfied, regardless of the content of the shared boss HP information 423. This is, for example, the case where the value of the shared boss HP information 423 does not reach 0 when only a given damage value transmitted from the terminal is added, but a defeat by an "additional attack" has occurred in the TBSG process in the information processing terminal 102.

In addition, any condition determination or process may be used, as long as a process of considering the presently appearing shared boss as being defeated and replacing the shared boss when a state where the total of respective given damage by a plurality of players exceeds the maximum HP of the shared boss is obtained, can be realized.

On the other hand, as a result of the determination in step S44, if the condition for replacing the presently appearing shared boss has not been satisfied (NO in step S44), the processor 111 returns to step S41 and repeats the process. This is the end of the description of the server-side update process.

As described above, in the exemplary embodiment, the HP of the raid boss 205 (individual boss) is individually set for each information processing terminal 102 by using the HP of the shared boss at a predetermined time in the past, and the TBSG is performed. Therefore, a situation where, after one game ends in a state where the HP is close to 0, the raid boss has already been defeated by another player when a challenge is made again, can be prevented from occurring. Accordingly, the chances that the player can obtain the "defeat reward" can be increased, and a decrease in motivation for the game can be prevented.

Moreover, by using the HP at a time in the past as described above, after communication with the server 101 is performed to acquire the instance environment data at the start of the TBSG, the TBSG can be advanced even without communication with the server 101. Therefore, there is no need to advance the game while obtaining the latest HP of the raid boss in real time as in a conventional raid battle, and the amount of communication with the server 101 can be reduced. In addition, a time lag or the like does not occur in communication with the server 101 during the TBSG, and thus a comfortable play sense can be provided to the player.

Moreover, in the exemplary embodiment, the basic game progress in the TBSG is a game progress in the form of single-play, but an additional attack by an "allied army" is performed after seven turns. Accordingly, a sense of "cooperative battle" in which the player is battling against the raid boss 205 together with other players can be produced. In particular, when the raid boss is defeated by the additional attack, it is possible to provide a stronger sense of cooperative battle to the player.

[Modifications]

In the above exemplary embodiment, the example in which the HP indicated by the shared boss HP information 423 becomes 0 has been described as an example of the "condition for replacing". In this regard, in the TBSG process executed in the information processing terminal 102, control may be performed such that the HP of the individual boss does not become 0 by an attack of the own units 204 and is left at least as one. Accordingly, a situation where the additional attack will occur without fail can be obtained, and a sense of cooperative battle together with other players can be enhanced (in this case, the defeat of the individual boss is always a defeat by the additional attack).

In the TBSG process, when the player side (own units 204) is "completely defeated", transmission of the given damage information as described above may not be performed. Moreover, in this case, the value of the individual boss HP may be returned to the value that is before the TBSG starts. That is, when the player side is completely defeated, only the challenge stamina value may be decreased and the individual boss HP may be unchanged.

Upon update of the shared boss HP in the server-side update process, the present individual boss HP 515 transmitted from the information processing terminal 102 may be compared to the shared boss HP information 423, and control may be performed such that the shared boss HP is adjusted to the present individual boss HP if the present individual boss HP is lower than the shared boss HP. Accordingly, the given damage that has occurred in the TBSG process in each information processing terminal 102 and that includes damage by an additional attack can be reflected in change of the shared boss HP of the raid boss.

In the above exemplary embodiment, the example in which the HP of the raid boss one hour before the time when the player performs the event participation operation is used has been described. The time that is the base point for one hour before is not limited to the above example. The base point may be any time during a period from the timing when the player performs the event participation operation to the time when the TBSG actually starts.

In the above exemplary embodiment, the example in which the individual boss HP information 4132 is updated with the content of the present individual boss HP 515 has been described. In another exemplary embodiment, the information of the individual boss HP (HP one hour before in the above example) that is set upon generation of the instance environment data (hereinafter, HP for a terminal) and the information of the HP indicated by the present individual boss HP 515 (hereinafter, HP per player) may be stored as separate data. Then, if an instruction to start the TBSG is made outside the above-described validity period, the HP for a terminal is acquired from the server 101 and set as the individual boss HP, and, if an instruction to start the TBSG is made within the validity period, the HP per player may be acquired instead of the HP for a terminal and set as the individual boss HP.

In the above exemplary embodiment, raid boss replacement is performed when the shared boss HP of the raid boss becomes 0. In another exemplary embodiment, such raid boss replacement may not be performed. In this case, upon generation of the instance environment data, even if the shared boss HP is 0 at that time, if the HP one hour before that time is not 0, the individual boss HP may be set using the HP one hour before. Accordingly, the chances that the player can battle against the raid boss can be increased, and the chances of obtaining a defeat reward can be increased.

In the case of performing raid boss replacement, and also when the event participation operation is performed before one hour elapses after the shared boss HP becomes 0, the chances of obtaining a defeat reward can still be increased. A specific example will be described with FIG. 11 described above. For example, the case where the player B performs the event participation operation between 4:10 and 5:09 is assumed. That is, the case where the event participation operation is performed by the player B before one hour elapses after the shared boss HP of the raid boss A becomes 0 is assumed. In this case, the HP of the raid boss A one hour before the time when the event participation operation is performed by the player B has not become 0 yet. Thus, the HP of the raid boss A one hour before the time when the event participation operation is performed by the player B is set as the individual boss HP. As a result, the player B can battle against the raid boss A that has already been defeated when considered in real time. In addition, in this case, there is a high possibility that the HP of the raid boss A is low, and therefore, there is a high possibility that the player B can defeat the raid boss A, thereby increasing the chances of obtaining a defeat reward for the raid boss A.

In the above exemplary embodiment, the example in which the shared boss HP information 423 is stored in the server 101 has been described. However, in another exemplary embodiment, this data may not be stored, and a value corresponding to the shared boss HP information 423 may be calculated as needed on the basis of the maximum HP information 422 and the given damage history data 404.

In another exemplary embodiment, in the TBSG process in the information processing terminal 102, if it is possible for the player to defeat the individual boss by an attack by the own units 204, control in which an additional attack representation is performed and then the individual boss is defeated by the own units 204, may be controlled. For example, the case where, as a result of calculation after an operation by the player for an attack using the own units 204 is received, it is determined that it is possible to defeat the raid boss by the attack of the own units 204, is assumed. In this case, control may be performed such that the above-described representation for an additional attack is performed before a representation of the attack by the own units 204 is performed, and then the representation of the attack by the own units 204 and a defeat representation are executed.

In the above exemplary embodiment, the example in which a battle against a raid boss is performed in the TBSG has been described, but the battle is not limited thereto. A battle against a raid boss may be performed using the method of a game (action game, puzzle game, etc.) of another genre.

Regarding the subject that executes the processes as described above, the configuration thereof is not limited to the above configuration. For example, in the above information processing system, a server side system may include a plurality of information processing apparatuses, and a process to be executed in the server side system may be divided and executed by the plurality of information processing apparatuses.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. An information processing system for providing a game in which a plurality of players cooperate to battle against enemy character, the information processing system including at least one processor, a server and a plurality of information processing terminals,
   wherein the server is configured to store, in a data store included in the server, given damage information indicating damage given to the enemy character by each of the plurality of players and a timing when the damage is given, and
   wherein each of the information processing terminals is configured to perform operations comprising:
     acquiring at least a part of the given damage information of the damage given to the enemy character by another player before a predetermined time after a start timing when the game is started by an operation of the player, as additional damage information from the server, and
     executing game processing for a game of battling against the enemy character, by at least:
       executing a first event of calculating damage to be given to the enemy character on the basis of the game processing and giving the calculated damage to the enemy character,
       executing a second event of giving additional damage to the enemy character on the basis of the additional damage information, and
       transmitting the given damage information indicating the damage given to the enemy character in the first event, to the server in order to store the given damage information in the data store.

2. The information processing system according to claim 1, wherein:
   the server is configured to store a hit point of the enemy character in the data store, and
   each of the information processing terminal acquires terminals is configured to perform operations further comprising:
     acquiring a hit point of the enemy character a predetermined time before the start timing, as a terminal hit point from the server,
     executing game processing of battling against the enemy character for which the terminal hit point is set, and
     if the terminal hit point after the execution of the first event and the second event satisfies a victory condition for the hit point of the enemy character, determining that the enemy character is defeated, and ending the game processing.

3. The information processing system according to claim 2, wherein the server is configured to acquire the given damage information from the plurality of information processing terminals, and to store in the data store a latest hit point of the enemy character calculated on the basis of the given damage information, as a latest hit point.

4. The information processing system according to claim 3, wherein, even when the latest hit point of the enemy character satisfies the victory condition, if the hit point of the enemy character the predetermined time before does not satisfy the victory condition, the information processing terminals are configured to acquire the hit point, as the terminal hit point of the enemy character that is caused to appear in the game processing, from the server.

5. The information processing system according to claim 2, wherein:
   the information processing terminals are configured to transmit a hit point of the enemy character calculated on the basis of the execution of the first event and the second event, as a hit point per player,
   the server is configured to set a predetermined validity period for the acquired hit point per player and stores to store in the data store the hit point per player,
   if the start timing is within the predetermined validity period, the information processing terminals are configured to acquire the hit point per player, instead of the hit point of the enemy character the predetermined time before, from the server, and
   if the start timing is within the predetermined validity period, the information processing terminals are configured to execute game processing in which the enemy character for which the hit point per player is set appears.

6. The information processing system according to claim 3, wherein:
   the server is configured to set a first enemy character as the enemy character, and then update the enemy character to a second enemy character if a latest hit point of the first enemy character satisfies the victory condition, and
   if a hit point of the first enemy character the predetermined time before satisfies the victory condition and a hit point of the second enemy character does not satisfy the victory condition, the information processing terminals are configured to acquire a hit point of the second enemy character the predetermined time before, as an enemy hit point from the server.

7. The information processing system according to claim 5, wherein:
   the server is configured to set a first enemy character as the enemy character, and then update the enemy character to a second enemy character if a latest hit point of the first enemy character satisfies the victory condition, and
   if a hit point per player of the first enemy character satisfies the victory condition, the information processing terminals are configured to execute game processing in which the second enemy character appears in place of the first enemy character.

8. The information processing system according to claim 7, wherein the information processing terminals are configured to perform further operations comprising:
   executing a first event of calculating damage to be given to the second enemy character on the basis of the game processing and giving the calculated damage to the second enemy character, and
   even if the additional damage information relates to damage given to the first enemy character, executing a second event of giving additional damage to the second enemy character on the basis of the additional damage information.

9. The information processing system according to claim 1, wherein:
   in the game processing executed by the information processing terminals, a predetermined limit period for achieving the victory condition is set, and
   if the victory condition is not achieved within the predetermined limit period, the information processing terminals are configured to execute the second event.

10. The information processing system according to claim 9, wherein:
it is impossible to satisfy the victory condition by the execution of the first event, and
it is possible to satisfy the victory condition by the execution of the second event.

11. The information processing system according to claim 9, wherein, regardless of a result of the execution of the first event, if the victory condition is satisfied by the execution of the second event, the information processing terminals are configured to determine that the victory condition is achieved.

12. The information processing system according to claim 1, wherein, if a hit point of the enemy character satisfies the victory condition as a result of the calculation of the damage in the first event, the information processing terminals are configured to execute a process in the second event and then execute a process in the first event.

13. The information processing system according to claim 1, wherein the information processing terminals are configured to perform operations further comprising:
acquiring information indicating an image of another player character associated with another player who has caused the damage related to the additional damage information, and
executing the second event such that a process of displaying a motion of the other player character giving the additional damage to the enemy character is included.

14. A non-transitory computer-readable storage medium having stored therein an information processing program executed executable by a processor of an information processing apparatus which is configured to executes a game in which a plurality of players cooperate to battle against enemy character, the information processing program, when executed, causing the information processing apparatus to perform operations comprising:
acquiring, from a server holding given damage information indicating damage given to the enemy character by each player and a timing when the damage is given, at least a part of the given damage information as additional damage information, and
executing game processing for a game of battling against the enemy character, by at least:
executing a first event of calculating damage to be given to the enemy character on the basis of the game processing and giving the calculated damage to the enemy character,
executing a second event of giving additional damage to the enemy character on the basis of the additional damage information, and
transmitting the given damage information indicating the damage given to the enemy character in the first event, to the server.

15. A processing apparatus including at least one processor and a memory, the processing apparatus being configured to perform operations comprising:
acquiring, from a server holding given damage information indicating damage given to an enemy character by each player and a timing when the damage is given, at least a part of the given damage information as additional damage information, and
executing game processing for a game of battling against the enemy character, by at least:
executing a first event of calculating damage to be given to the enemy character on the basis of the game processing and giving the calculated damage to the enemy character,
executing a second event of giving additional damage to the enemy character on the basis of the additional damage information, and
transmitting the given damage information indicating the damage given to the enemy character in the first event, to the server.

16. An information processing method executed in an information processing system including a server and a plurality of information processing apparatuses, wherein the server is configured to store given damage information indicating damage given to the enemy character by each of the plurality of players and a timing when the damage is given, the method comprising causing each of the information processing terminals to execute:
acquiring, via at least one processor of the respective information processing terminal, at least a part of the given damage information of the damage given to the enemy character by another player before a predetermined time after a start timing when the game is started by an operation of the player, as additional damage information from the server, and
executing, via the at least one processor of the respective information processing terminal, game processing for a game of battling against the enemy character, by at least:
executing a first event of calculating damage to be given to the enemy character on the basis of the game processing and giving the calculated damage to the enemy character,
executing a second event of giving additional damage to the enemy character on the basis of the additional damage information, and
transmitting the given damage information indicating the damage given to the enemy character in the first event, to the server in order to store the given damage information on the server.

17. The information processing method according to claim 16, wherein:
the server is configured to store a hit point of the enemy character in the data store, and
the method further causes each of the information processing terminals to execute:
acquiring a hit point of the enemy character a predetermined time before the start timing, as a terminal hit point from the server,
executing game processing of battling against the enemy character for which the terminal hit point is set, and
if the terminal hit point after the execution of the first event and the second event satisfies a victory condition for the hit point of the enemy character, determining that the enemy character is defeated, and ending the game processing.

18. The information processing method according to claim 17, wherein the server is configured to acquire the given damage information from the plurality of information processing terminals, and to store in the data store a latest hit point of the enemy character calculated on the basis of the given damage information, as a latest hit point.

19. The information processing method according to claim 18, wherein, even when the latest hit point of the enemy character satisfies the victory condition, if the hit point of the enemy character the predetermined time before does not satisfy the victory condition, the information processing terminals are configured to acquire the hit point, as the terminal hit point of the enemy character that is caused to appear in the game processing, from the server.

20. The information processing method according to claim 17, wherein:
- the information processing terminals are configured to transmit a hit point of the enemy character calculated on the basis of the execution of the first event and the second event, as a hit point per player,
- the server is configured to set a predetermined validity period for the acquired hit point per player and to store in the data store the hit point per player,
- if the start timing is within the predetermined validity period, the information processing terminals are configured to acquire the hit point per player, instead of the hit point of the enemy character the predetermined time before, from the server, and
- if the start timing is within the predetermined validity period, the information processing terminals are configured to execute game processing in which the enemy character for which the hit point per player is set appears.

* * * * *